(12) United States Patent
Pflederer

(10) Patent No.: US 12,380,019 B2
(45) Date of Patent: Aug. 5, 2025

(54) SYSTEM MEMORY ADDRESS DECODING FOR INTERLEAVING ADDRESSES ACROSS PHYSICAL REGIONS OF A SYSTEM-ON-CHIP (SOC) AND ACROSS SHARED MEMORY RESOURCES IN A PROCESSOR-BASED SYSTEM

(71) Applicant: QUALCOMM Incorporated, San Diego, CA (US)

(72) Inventor: Keith Robert Pflederer, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/511,079

(22) Filed: Nov. 16, 2023

(65) Prior Publication Data

US 2024/0320140 A1    Sep. 26, 2024

Related U.S. Application Data

(60) Provisional application No. 63/491,506, filed on Mar. 21, 2023.

(51) Int. Cl.
*G06F 12/02* (2006.01)
(52) U.S. Cl.
CPC .................. *G06F 12/023* (2013.01)
(58) Field of Classification Search
CPC ............. G06F 12/0607; G06F 12/1063; G06F 12/0864; G06F 12/109; G06F 12/023; G06F 12/084
See application file for complete search history.

(56) References Cited

U.S. PATENT DOCUMENTS

| | | | |
|---|---|---|---|
| 10,403,333 B2 | 9/2019 | Brandl et al. | |
| 2010/0042759 A1 | 2/2010 | Srinivasan et al. | |
| 2017/0168954 A1* | 6/2017 | Meyer | G06F 13/4068 |
| 2024/0370371 A1* | 11/2024 | Hammarlund | G06F 13/4068 |

OTHER PUBLICATIONS

International Search Report and Written Opinion for International Patent Application No. PCT/US2024/020378, mailed Jun. 20, 2024, 11 pages.
Arm Limited, "Arm® Neoverse™ CMN-700 Coherent Mesh Network," Technical Reference Manual, Revision: r3p0, Issue 05, Sep. 2022, 1299 pages.

* cited by examiner

*Primary Examiner* — Curtis James Kortman
(74) *Attorney, Agent, or Firm* — W&T

(57) ABSTRACT

System memory address decoding for interleaving addresses across physical regions of a system on hip (SOC) and across shared memory resources in a processor based system and related hashing circuits are disclosed. In exemplary aspects, the SoC is configured to discover, for every range of addresses, the number of physical regions and the number and/or size of the shared memory resources available including caches, snoop filters and memory interfaces within each physical region. The SoC may include a system memory address decoding circuit that is configured to adaptively decode a memory address based on the memory address range in which the system address resides and then direct such memory access request to the proper shared memory resource so that each address in the memory address range spans across all of the shared memory resource in the range.

21 Claims, 12 Drawing Sheets

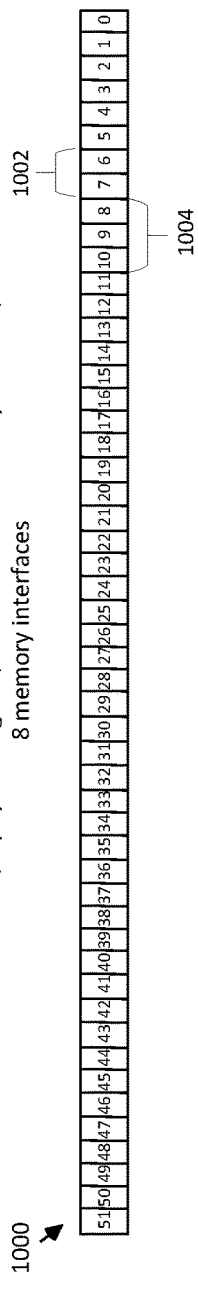
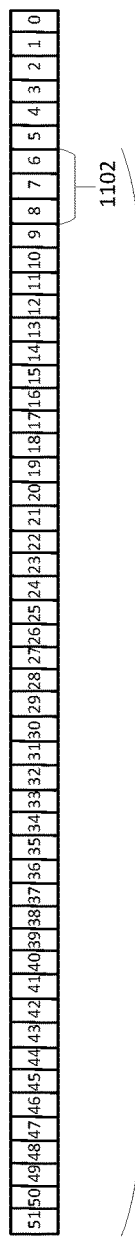
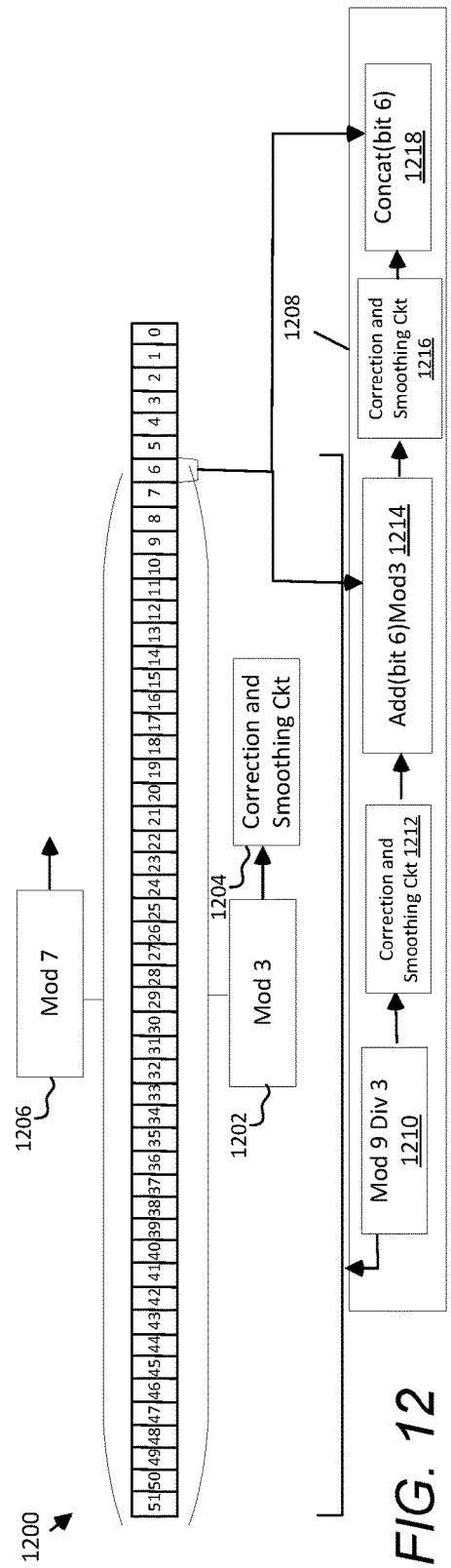
FIG. 10
FIG. 11
FIG. 12

| Physical Region | SSC hash | SSC | Addr Range 0 | Addr Range 1 | Addr Range 2 | Addr Range 3 | Addr Range 4 | Addr Range 5 | Addr Range 6 | Addr Range 7 |
|---|---|---|---|---|---|---|---|---|---|---|
| 0 | 0 | SSC_0 | 0000: MI_1 | 3100: MI_0 | 2a00: MI_0 | 2300: MI_0 | 1C00: MI_0 | 1500: MI_0 | 0e00: MI_0 | 0700: MI_0 |
| 0 | 1 | SSC_1 | 0800: MI_2 | 0100: MI_2 | 3200: MI_1 | 2b00: MI_1 | 2400: MI_1 | 1d00: MI_1 | 1600: MI_1 | 0f00: MI_1 |
| 0 | 2 | SSC_2 | 1000: MI_3 | 0900: MI_3 | 0200: MI_3 | 3300: MI_2 | 2c00: MI_2 | 2500: MI_2 | 1e00: MI_2 | 1700: MI_2 |
| 0 | 3 | SSC_3 | 1800: MI_4 | 1100: MI_4 | 0a00: MI_4 | 0300: MI_4 | 3400: MI_3 | 2d00: MI_3 | 2600: MI_3 | 1f00: MI_3 |
| 0 | 4 | SSC_4 | 2000: MI_5 | 1900: MI_5 | 1200: MI_5 | 0b00: MI_5 | 0400: MI_5 | 3500: MI_4 | 2e00: MI_4 | 2700: MI_4 |
| 0 | 5 | SSC_5 | 2800: MI_6 | 2100: MI_6 | 1a00: MI_6 | 1300: MI_6 | 0c00: MI_6 | 0500: MI_6 | 3600: MI_5 | 2f00: MI_5 |
| 0 | 6 | SSC_6 | 3000: MI_7 | 2900: MI_7 | 2200: MI_7 | 1b00: MI_7 | 1400: MI_7 | 0d00: MI_7 | 0600: MI_7 | 3700: MI_6 |

*FIG. 14*

SYSTEM MEMORY ADDRESS DECODING FOR INTERLEAVING ADDRESSES ACROSS PHYSICAL REGIONS OF A SYSTEM-ON-CHIP (SOC) AND ACROSS SHARED MEMORY RESOURCES IN A PROCESSOR-BASED SYSTEM

PRIORITY APPLICATION

The present application claims priority to U.S. Provisional Patent Application Ser. No. 63/491,506, filed Mar. 21, 2023 and entitled "SYSTEM MEMORY ADDRESS DECODING FOR INTERLEAVING ADDRESSES ACROSS PHYSICAL REGIONS OF A SYSTEM-ON-CHIP (SOC) AND ACROSS SHARED MEMORY RESOURCES IN A PROCESSOR-BASED SYSTEM," which is incorporated herein by reference in its entirety.

BACKGROUND

I. Field of the Disclosure

The technology of the disclosure relates generally to system memory addressing in a computer system, and more particularly to mapping system memory addresses to distributed memory resources in a computer system.

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU or as a discrete hardware element that is separate from the CPU. A PU(s) executes software instructions that instruct a processor to fetch data from a location in memory and to perform one or more processor operations using the fetched data. The result may then be stored in memory. For example, this memory can be a cache memory local to the PU, a shared local cache among PUs in a PU block, a shared cache among multiple PU blocks, and/or a system memory in a processor-based system. Cache memory, which can also be referred to as just "cache," is a smaller, faster memory that stores copies of data stored at frequently-accessed memory addresses in a main memory or higher-level cache memory to reduce memory access latency. Thus, a cache memory can be used by a PU to reduce memory access times.

When data requested by a memory read request is present in a cache memory (i.e., a cache "hit"), system performance may be improved by retrieving the data from the cache instead of slower access system memory. Conversely, if the requested data is not found in the cache (resulting in a cache "miss"), the requested data then must be read from a higher-level cache memory or a system memory.

PUs utilize system memory addresses to route memory requests to the appropriate memory resource such as a shared cache or system memory. Computer systems utilize system memory address maps which map memory address ranges to physical memory resources. Computer systems also include hashing hardware for decoding system memory addresses and identifying the appropriate memory resource to direct memory access requests such as memory writes and memory reads to the memory resource that is configured to store the data requested.

SUMMARY

Aspects disclosed in the detailed description include system memory address decoding for interleaving addresses across physical regions of a system-on-chip (SoC) and across shared memory resources. A SoC is an integrated circuit (IC) chip that includes a processor with one or more processor units and an on-chip memory system. A SoC may also include other computing resource circuits on the IC chip as well. The on-chip memory system includes shared memory resources such as caches, snoop filters, and memory interfaces to system memory. The processor units are configured to issue memory access requests to the on-chip memory system. To provide for the ability of the physical address space of the on-chip memory system to be configurable in size, the SoC includes a plurality of memory interfaces in which respective memory chips (e.g., DRAM chips) can be coupled as a shared memory resource. The shared memory resources may reside in different physical locations/regions in the SoC relative to processor units to balance access times between processor units and memory interfaces. The physical address space can be configured into a plurality of address ranges based on the number and size of memory chips that are coupled to the memory interfaces and the number of operable caches and snoop filters. However, with this flexibility in configuration of the size of the physical address space, the SoC includes a way in which to access the physical address space given that any number of memory interfaces may be coupled to memory chips. In this regard, in exemplary aspects, the SoC is configured to discover, for every range of addresses, the number of physical regions and the number and/or size of the shared memory resources available including caches, snoop filters and memory interfaces within each physical region. The SoC may include a system memory address decoding circuit that is configured to adaptively decode a memory address received in a memory access request from a processor unit based on the memory address range in which the system address resides and then direct such memory access request to the proper shared memory resource. For example, in exemplary aspects, the SoC is configured to interleave sequential memory addresses to the available shared memory resources across both physical regions in which the available shared memory resources are located and across shared memory resources within a physical region. The SoC is also configured to decode memory access requests to effectuate such interleaving.

In one exemplary aspect, a method of determining a target identification for a memory request is disclosed. The method comprises discovering configuration parameters comprising a plurality of available shared memory resources on a system on chip in one or more physical regions, each of the plurality of available shared memory resources associated with a target identifier, the configuration parameters comprising locations for system memory addresses which are interleaved across one or more physical regions and one or more available shared memory resources within a physical region, the configuration parameters further comprising a plurality of hashing regions wherein each hashing region includes a hash circuit and corresponds to a unique combination of one or more physical regions and one or more available memory resources. In response to receiving the memory request having a system address, the method further comprises determining a first hashing region of the plurality of hashing regions in which the system address resides, hashing the system address based on a first hash circuit corresponding to the first one of the plurality of hashing regions to identify a first physical region, hashing the system address based on a second hash circuit corresponding to the first one of the plurality of hashing regions to select a first available shared memory resource within the first physical region; and determining a first target identifier of the first available shared memory resource.

In other exemplary aspects, each memory address range within a physical address space may map to a different number of physical regions and the number and size of shared memory resources present in each physical region within the SoC may also be different. For each memory address range, the SoC and/or its system memory address decoding circuit may advantageously employ different memory decoding techniques to direct a memory request to the proper shared memory resource while achieving interleaving across physical regions and across shared memory resources within the same physical region.

In today's complex SoCs, the number of shared memory resources may include over 32 shared system memory caches and over 32 shared memory interface controllers such that if only a small portion of the SoC is not usable, there will be plenty of shared memory resources to address workloads of the SoC. By utilizing SoCs with unusable portions, chip yields can be increased which will reduce waste and save costs. Additionally, given today's complex SoCs, interleaving memory addresses across all the shared memory resources will lessen the opportunity for hot spots at some memory resources and reduce delays by the interconnect network routing memory requests between resources on the SoC. Interleaving memory means that the next sequential address of a physical address space will map to the next shared memory resource. Given that the size of a manufacturing failure may be unpredictable, various unique configurations of memory resources may exist on a SoC and the system memory address decoder will have to adapt to continue interleaving memory addresses across its useable shared memory resources.

For example, when a memory address range of a physical address space spans four regions, eight (8) caches/snoop filters per region, and eight (8) memory interfaces, the SoC and/or the system memory address decode circuit can take advantage of the power of two (2) relationship to decode the region and shared memory resources either by employing an OR-based logic operation (e.g. XOR or OR operations) in an OR-based logic circuit of multiple bit positions in the system memory address or decoding specific bit positions in the system memory address for the region, cache/snoop filter, and memory interfaces. Furthermore, in this example, since the number of caches/snoop filters equal the number of memory interfaces, the SoC and/or the system memory address decode circuit utilizes the same bits for decoding these shared memory resources.

In another example, when a memory address range of a physical address space spans regions and shared memory resources where the number of at least one of the regions or shared memory resources is not a power of two, the SoC and/or the system memory address decode circuit applies modular arithmetic to the system memory address to decode the target entity which does not have a power of two relation. For example, if the memory address range spans three physical regions, eight caches/snoop filters per region, and eight memory interfaces, the SoC and/or the system memory address decode circuit can apply a modulo three circuit to the system address to decode the specific region and either apply an XOR circuit of multiple bit positions in the system memory address to decode the cache/snoop filter and memory channel or decode specific bit positions in the system memory address for the cache/snoop filter and memory channel.

In another example, when a memory address range of a physical address space spans physical regions and shared memory resources whose number is not a power of two, the SoC and/or the system memory address decoding circuit applies modulo operations to decode both the physical region and the shared memory resource. For example, if the memory address range spans three physical regions, and, in each physical region, there are seven shared cache memories and six shared memory interfaces, the SoC and/or the system memory address decoding circuit applies a modulo three circuit to the system address to decode the physical region and a modulo seven circuit to the system address to decode the shared cached memory resource. If the memory request doesn't hit in the decoded shared cache memory resource (i.e., cache/snoop filter), the system address memory decode circuit has to apply a modulo nine circuit and a div three circuit, and add circuit of the lowest bit of a portion of the system address, and also concatenate the lowest bit to decode the memory interface. Doing so, the SoC and/or the system memory address decoding circuit ensures that the memory addresses in this memory range are interleaved over all the memory interfaces in each of the three (3) physical regions.

When a first address range ends and a second address range begins, the system address decoding circuit ensures that the first address in the second address range decodes the system address to select the next sequential shared memory resource. Take for example the situation where the first address range interleaves system memory addresses across four (4) physical regions and eight (8) caches/snoop filters and eight (8) memory interfaces in each physical region, and the second address range interleaves system memory addresses across three (3) physical regions and eight (8) caches/snoop filters in each physical region. And, the last address in the first range decodes to the last shared memory resource in the fourth physical region. Since, in this example, the number of physical regions in the second address range is not a power of two (i.e., 3 physical regions), the system address decoding circuit ensures that the first address in the second address range decodes the system address to direct the memory request to the first shared memory resource in the first physical region. In general, whenever any set of targeted resources in a second address region is not a power of two, the system address decoding circuit ensures that the first address in the second address region decodes the system address to direct the memory request to the targeted resource in the set of targeted resources next to the targeted resource which was targeted by the last address in a first address region. The term "targeted resources" is defined to be physical regions, shared cache memory resources, and memory interfaces in a particular hashing region.

The SoC and/or the system memory address decoding circuit described herein can be flexible to interleave memory addresses across various unique hardware configurations of shared memory resources. These unique hardware configurations may be caused by various situations including an equipment manufacturer adding various size system DRAM memory modules to connect to a SoC or, during manufacturing, portions of the SoC may be deemed inoperable such that some memory controllers and/or some shared system memory caches are unusable while other portions of the SoC are usable.

BRIEF DESCRIPTION OF THE DRAWINGS

FIG. 10 is an exemplary bit hash circuit in FIGS. 6 and 7 for a system memory address which resides in an address range that spans one socket, four (4) physical regions in the socket, eight (8) shared cache memory resources in each physical region, and eight (8) memory interfaces in each physical region;

FIG. 11 is an exemplary hash circuit in FIGS. 6 and 7 for a system memory address which resides in an address range that spans one socket, three (3) physical regions in the socket, eight (8) shared cache memory resources in each physical region, and eight (8) memory interfaces in each physical region;

FIG. 12 is an exemplary hash circuit in FIGS. 6 and 7 for a system memory address which resides in an address range that spans one socket, three (3) physical regions in the socket, seven (7) shared cache memory resources in each physical region, and six (6) memory interfaces in each physical region;

FIG. 14 is an exemplary configuration of a collection of memory index tables where each memory index table is unique for a shared cache memory resource in the same physical region to interleave system memory addresses across memory interfaces when the ratio of shared cache memory resources to memory interfaces is 7:8;

DETAILED DESCRIPTION

Figure 1:
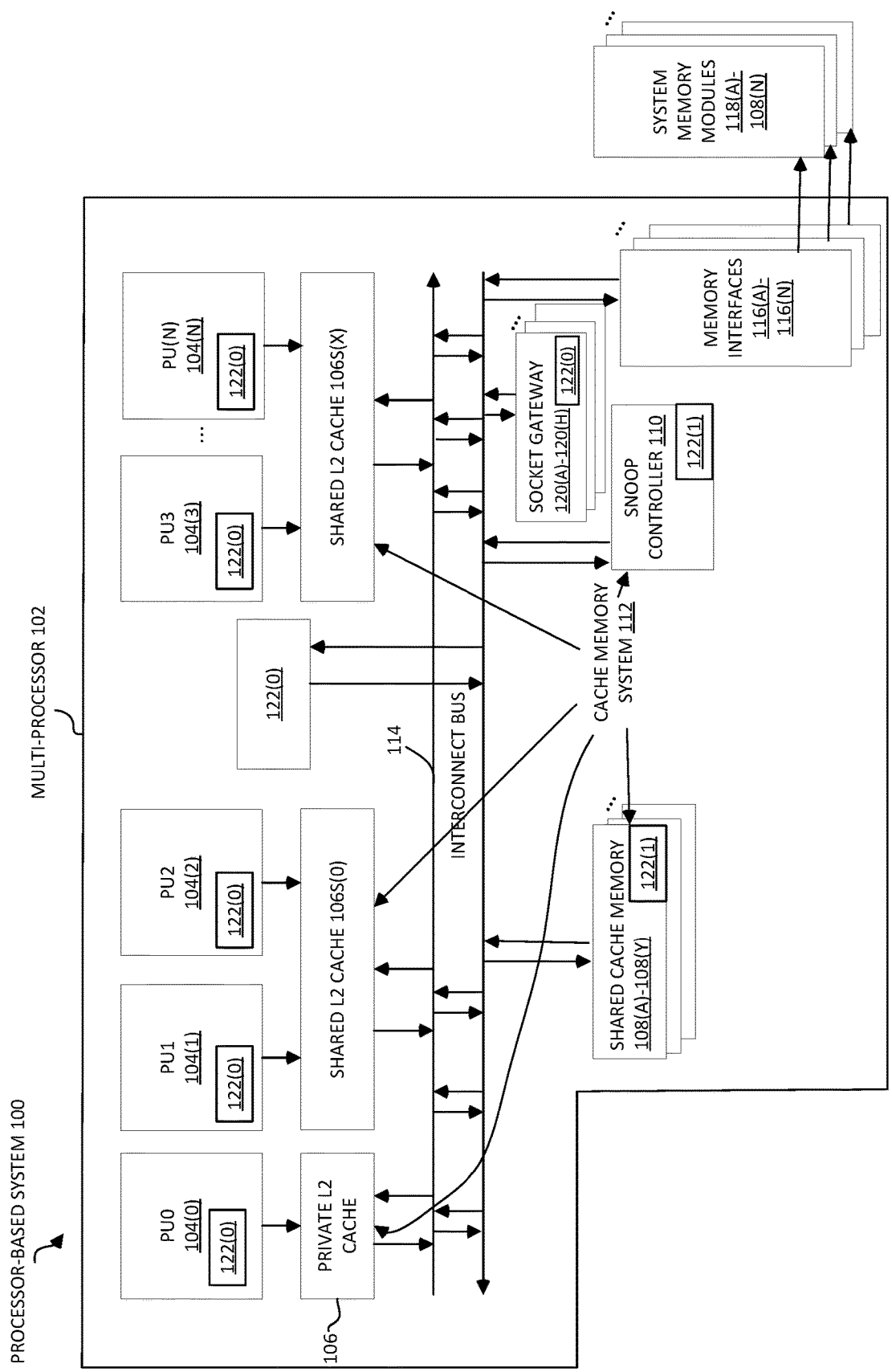
FIG. 1 is a block diagram illustrating an exemplary processor-based system for interleaving addresses across physical regions and across shared memory resources.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include system memory address decoding for interleaving addresses across physical regions of a system-on-chip (SoC) and across shared memory resources. An SoC is an integrated circuit (IC) chip that includes a processor with one or more processor units and an on-chip memory system. An SoC may also include other computing resource circuits on the IC chip as well. The on-chip memory system includes shared memory resources such as caches, snoop filters, and memory interfaces to system memory. The processor units are configured to issue memory access requests to the on-chip memory system. To provide for the ability of the physical address space of the on-chip memory system to be configurable in size, the SoC includes a plurality of memory interfaces in which respective memory chips (e.g., DRAM chips) can be coupled as a shared memory resource. The shared memory resources may reside in different physical locations/regions in the SoC relative to processor units to balance access times between processor units and memory interfaces. The physical address space can be configured into a plurality of address ranges based on the number and size of memory chips that are coupled to the memory interfaces and the number of operable caches and snoop filters. However, with this flexibility in configuration of the size of the physical address space, the SoC includes a way in which to access the physical address space given that any number of memory interfaces may be coupled to memory chips. In this regard, in exemplary aspects, the SoC is configured to discover, for every range of addresses, the number of physical regions and the number and/or size of the shared memory resources available including caches, snoop filters and memory interfaces within each physical region. The SoC may include a system memory address decoding circuit that is configured to adaptively decode a memory address received in memory access request from a processor unit based on the memory address range in which the system address resides and then direct such memory access request to the proper shared memory resource. For example, in exemplary aspects, the SoC is configured to interleave sequential memory addresses to the available shared memory resources across both physical regions in which the available shared memory resources are located and across shared memory resources within a physical region. The SoC is also configured to decode memory access requests to effectuate such interleaving.

In other exemplary aspects, each memory address range within a physical address space may map to a different number of physical regions and the number and size of shared memory resources present in each physical region within the SoC may also be different. For each memory address range, the SoC and/or its system memory address decoding circuit may advantageously employ different memory decoding techniques to direct a memory request to the proper shared memory resource while achieving interleaving across physical regions and across shared memory resources within the same physical region.

In this regard, FIG. 1 is a block diagram illustrating an exemplary processor-based system 100 for interleaving addresses across physical regions and across shared memory resources. The processor-based system 100 includes a multiple (multi-) processing unit (PU) (multi-PU) processor (multi-processor) 102 that includes multiple PUs 104(0)-104(N) and a hierarchical memory system. As part of the hierarchical memory system, for example, PU 104(0) includes a private local cache memory 106, which may be a level 2 (L2) cache memory. PUs 104(1), 104(2) and PUs 104(3)-PU 104(N) are configured to interface with respective local shared cache memories 106S(0)-106S(X), which may also be L2 cache memories for example. If a memory request is requested by any one of PUs 104(0)-104(N) and results in a cache miss to the respective cache memories 106, 106S(0)-106S(X), the memory request may be communicated to a next-level cache memory, which in this example is a shared cache memory 108(A)-108(Y). For example, the shared cache memory 108(A)-108(Y) may be a level 3 (L3) cache memory. Additionally, a snoop controller 110, also known as a snoop filter, will monitor the memory request to determine whether another shared L2 cache contains the latest data for the memory request. For purposes of this disclosure, the snoop controller 110 and the shared cache memory 108(A)-108(Y) are treated similarly with respect to routing memory requests. The cache memory 106, the local shared cache memories 106S(0)-106S(X), the snoop controller 110, and the shared cache memory 108(A)-108(Y) are part of a hierarchical cache memory system 112. An interconnect bus 114, which may be a coherent bus, is provided that allows each of the PUs 104(0)-104(N) to access the shared cache memories 106S(0)-106S(X) (if shared to the PUs 104(0)-104(N)), the snoop controller 110, the shared cache memory 108(A)-108(Y), and other shared resources coupled to the interconnect bus 114. If a memory request does not hit in the shared cache memory 108(A)-108(Y), the memory request will be directed to a memory interface 116(A)-116(N) which will either read or write data to an appropriate system memory module 118(A)-118(N). The system memory modules 118(A)-118(N) may be pluggable high-speed random access memory modules which may have different sizes. High-speed random access memory modules may include dynamic random access memory (DRAM), dual data rate memory (DDR), or any other random access solid state memory devices. The term "shared memory" resources includes the shared cache memory 108(A)-108(Y), the snoop controller 110, and the memory interfaces 116(A)-116(N). The term "shared cache memory" resources includes the shared cache memory 108(A)-108(Y) and the snoop controller 110. Each of the shared memory resources is associated with a unique target identifier which allows the interconnect bus 114 to direct the memory request to the appropriates shared memory resource. Optionally, if the multi-processor 102 is deployed in one SoC and is coupled to another multi-processor in another SoC, the multi-processor 102 includes a socket gateway 120(A)-120(H) through which a memory request is routed.

The processor-based system 100 in FIG. 1 includes a system address decoding circuit 122(0) or a shared system address decoding circuit 122(1) that is configured to decode a system memory address in a memory request and determine the unique target identifier for the interconnect bus 114 to route the memory request.

At boot-up of the multi-processor 102, the processor-based system 100 discovers configuration parameters associated with the characteristics of the multi-processor 102 including whether and to what extent any shared system cache memories 108(A)-108(Y) and memory interfaces 116(A)-116(N) are available, the size of each available shared system cache memory 108(A)-108(Y), the size of each system memory module 118(A)-118(N) coupled to the respective available memory interfaces 116(A)-116(N), and optionally the number of socket gateways 120(A)-120(H). The configuration parameters include memory regions containing a plurality of address ranges which interleaves memory addresses across physical regions and shared memory resources within each physical region. The description associated with FIG. 2 will illustrate an exemplary physical layout of the processor-based system 100. The description associated with FIGS. 3 and 4 will illustrate exemplary memory regions which interleave memory addresses across physical regions, available shared cache memory resources within a physical region, and memory interfaces within a physical region.

If optional socket gateways 120(A)-120(H) are deployed, when a PU 104(1)-104(N) prepares to issue a memory request, the system address decoding circuit 122(0) is configured to determine whether and to which socket gateway to route the memory request. Refer to the discussion in connection with FIG. 5 for a more detailed discussion of decoding a system memory address. If the memory request is not destined to a socket gateway 120(A)-120(H), the system address decoding circuit 122(0) is configured to determine an address region in which the system address resides and to hash the system address corresponding to the hash circuit associated with the address region to decode a physical region and a shared memory resource which should be the target of the memory request. Particular hash circuits will be discussed in connection with FIGS. 8-13. The system address decoding circuit 122(0) is also configured to determine the target identifier associated with the shared cache memory resource and to output the target identifier to the interconnect bus 114 to route the memory request to a specific shared cache memory resource 108(A)-108(Y), say 108(C) for example.

If there is a cache miss in the shared cache memory resource 108(C), the system address decoding circuit 122(1) of shared cache memory resource 108(C) is configured to determine an address region in which the system address resides and to hash the system address corresponding to the hash circuit associated with the address region to decode a memory interface 116(A)-116(N) which should be the next target of the memory request. The shared system address decoding circuit 122(1) is also configured to determine the target identifier associated with the specific memory interface 116(A)-116(N) and to output the target identifier to the interconnect bus 114 to route the memory request to a specific memory interface 116(A)-116(N).

If optional socket gateways 120(A)-120(H) are deployed, they would receive memory requests originating from another SoC coupled to a socket gateway 120(A)-120(H). In response to receiving a memory request originating from another SoC, the socket gateway 120(A)-120(H) will invoke the system address decoding circuit 122(0) to determine the unique target identifier for the shared cache memory resource on this chip in the same way as the system address decoding circuit 122(0) does when a memory request originates from any one of the PUs 104(0)-104(N).

Figure 2:
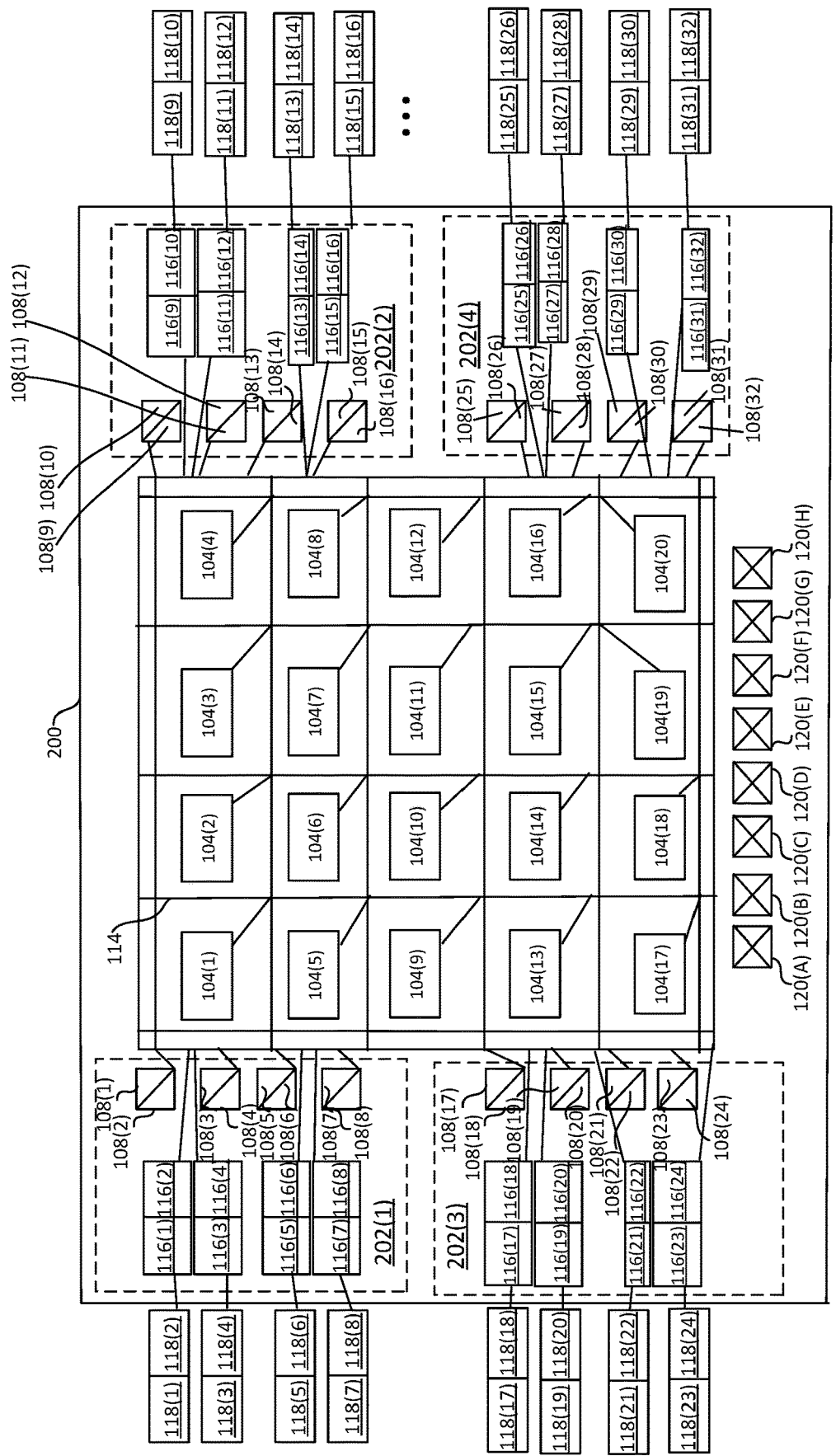
FIG. 2 is a physical layout on an integrated circuit (IC) chip of an exemplary configuration of the processor-based system in FIG. 1.

FIG. 2 is a physical layout of an IC chip for an exemplary configuration of the processor-based system 100 in FIG. 1. A SoC 200 is an IC chip containing a particular configuration of the multi-processor 102. The SoC 200 includes PUs 104(1)-104(20) coupled to the interconnect bus 114. The SoC 200 also includes four physical regions 202(1)-202(4). In each physical region 202(1)-202(4), there are eight shared cache memory resources, for example, 108(1)-108(8) and eight memory interfaces 116(1)-116(8). Each shared cache memory resource 108(1)-108(8) may route a memory request to any of the eight memory interfaces 116(1)-116(8). Each memory interface 116(1)-116(8) couples to a respective system memory module 118(1)-118(8). The SoC 200 also includes eight gateways 120(A)-120(H).

Figure 3:
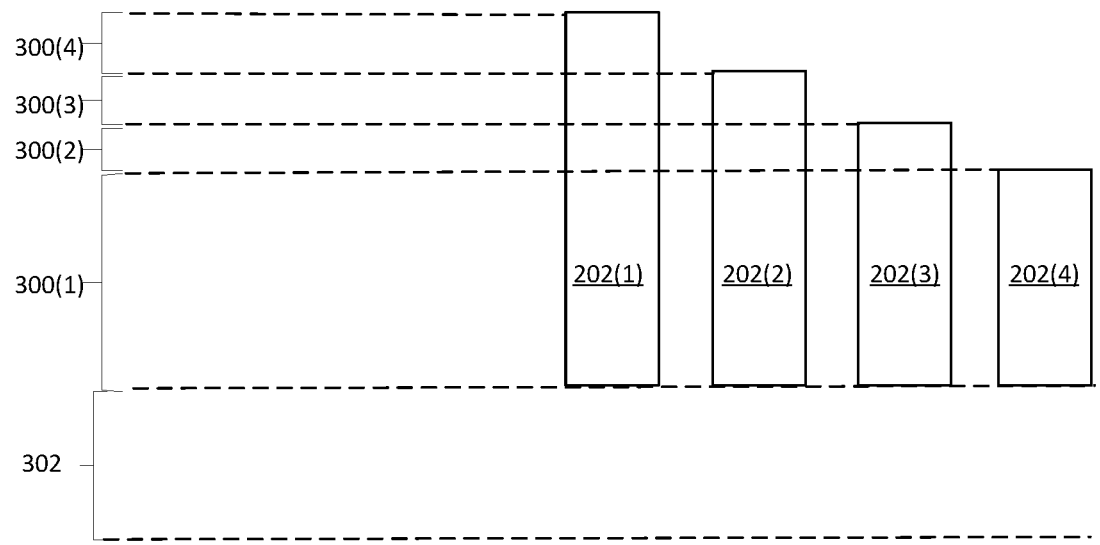
FIG. 3 is an exemplary set of interleave address ranges interleaved across four (4) physical regions in the IC chip in FIG. 2.
Figure 4:
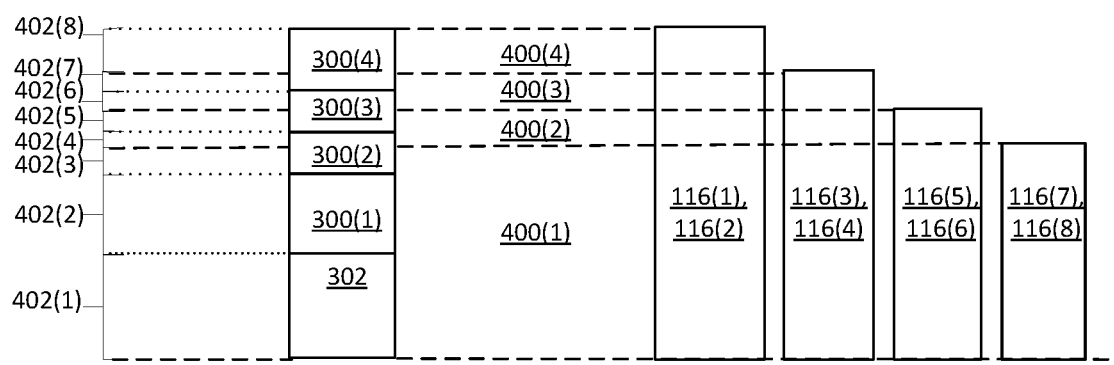
FIG. 4 is an exemplary set of hashing regions comprising ranges of addresses that are interleaved across both the interleave address ranges of FIG. 3 and four (4) memory interface pairs in FIG. 2.

FIG. 3 and FIG. 4 together describe how during the boot-up process, the processor-based system 100 creates configuration parameters including a set of hashing regions where each address range interleaves memory addresses across a unique combination of the physical regions 202(1)-202(4), the shared memory resources, and the system memory modules 118(A)-118(N) within each physical region 202(1)-202(4).

FIG. 3 is an exemplary set of address ranges that are interleaved across four physical regions in FIG. 2 and assumes that shared cache memory resources 118(1)-118(32) and memory interfaces 116(1)-116(32) are available. For this example, the processor-based system 100 is configured to discover at boot up that the memory capacity of the system memory modules 118(1)-118(8) in the physical region 202(1) is larger than the memory capacity of the system memory modules 118(9)-118(16) in the physical region 202(2), which is larger than the memory capacity of the system memory modules 118(17)-118(24) in the physical region 202(3), which is larger than the memory capacity of the system memory modules 118(25)-118(32) in the physical region 202(4).

The processor-based system 100 is also configured to create interleave physical regions 300(1)-300(4) at boot up. System memory addresses falling within interleave physical region 300(1) are interleaved across all four physical regions 202(1)-202(4). System memory addresses falling within interleave physical region 300(2) are interleaved across the physical regions 202(1)-202(3). System memory addresses falling within interleave physical region 300(3) are interleaved across physical regions 202(1)-202(2). System memory addresses falling within interleave physical region 300(4) are interleaved across physical region 202(1). The processor-based system 100 creates the interleave physical region 300(1) by consuming all memory installed in the smallest physical region 202(4). The processor-based system 100 creates the interleave physical region 300(2) by consuming all memory installed in the next smallest physical region 202(3), and so on. In other words, the processor-based system 100 creates the interleave physical regions 300(1)-300(4) where the lowest interleave physical region 300(1) spans all the memory in all physical regions of the SoC 200 until the memory in the smallest-sized physical region 202(4) is exhausted and the next interleave physical region 300(2) spans the remaining memory until the next smallest-sized region 202(3) is exhausted, and so on. The interleave physical regions 300(1)-300(4) are associated with unique regional hash circuits. Socket address region 302 is optional and used when the SoC 200 is coupled to another chip through the socket gateways 120(A)-120(H).

FIG. 4 is an exemplary set of hashing regions comprising ranges of addresses that are interleaved across both the physical regions 202(1)-20(4) and four memory interface pairs within each physical region 202(1)-202(4) in FIG. 2, for example, memory interface pairs 116(1)-116(2), 116(3)-116(4), 116(5)-116(6), 116(7)-116(8). For simplicity, each memory interface 116(1)-116(8) in a pair has equal memory capacity and corresponds to a respective system memory module 118(1)-118(8) pair. As shown in FIG. 4, memory interface pair 116(1)-116(2) has the largest memory capacity while memory interface pair 116(7)-116(8) has the smallest memory capacity. Unlike the memory interfaces 116(A)-116(N), the shared cache memory resources 108(A)-108(Y) are caches which are flexible in the memory addresses for which they are able to store data. As such, the processor-based system 100 determines the size of each system memory module 118(A)-(N) coupled to each memory interface 116(A)-116(N) in each physical region 202(1)-202(4) to interleave memory addresses across the system memory modules in that respective region.

As shown in FIG. 4, during boot up (also known as discovery), the processor-based system 100 is configured to determine that the system memory modules 118(1)-118(2) coupled to the memory interfaces 116(1)-116(2) have a larger capacity than the system memory modules 118(3)-118(4) coupled to the memory interfaces 116(3)-116(4), the system memory modules 118(3)-118(4) coupled to the memory interfaces 116(3)-116(4) have a larger capacity than the system memory modules 118(5)-118(6) coupled to the memory interfaces 116(5)-116(6), and so on. The processor-based system 100 determines memory interface interleave regions 400(1)-400(4) based on the sizes of the memory interface pairs. The processor-based system 100 determines hashing regions 402(1)-402(8) by overlaying the memory interface interleave regions 400(1)-400(4) and the interleave physical regions 300(1)-300(4). For every system memory address in hashing regions 402(1)-402(8), the processor-based system 100 establishes an order of targeted resources that will be interleaved in each hashing region 402(1)-402(8).

The socket address region 302 and socket hashing region 402(1) are optional and used when the SoC 200 is coupled to another chip through the socket gateways 120(A)-120(H) for sending memory requests to another chip and receiving memory requests from the other chip. The hashing regions 402(1)-402(8) define the physical address space of system addresses. Each hashing region that borders another hashing region is defined as being an adjacent hashing region. Additionally, the lowest memory address in one hashing region, e.g., 402(3), is adjacent to the highest memory address of the adjacent hashing region, e.g., 402(2). The lowest memory address in one hashing region maps to the available shared memory resource that is sequential to the available shared memory resource mapped by the highest memory address in the adjacent hashing region.

Figure 6:
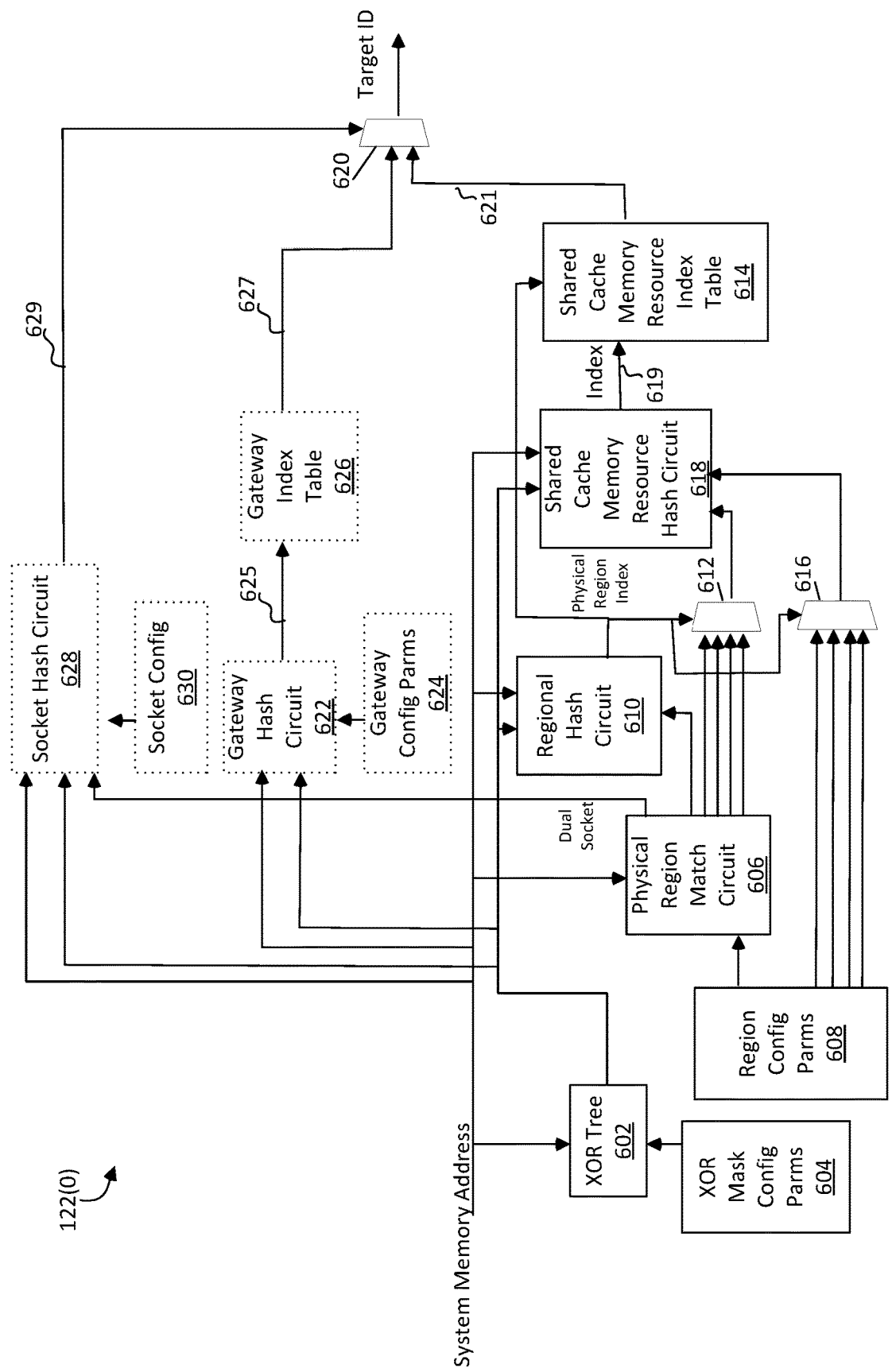
FIG. 6 is a block diagram of an exemplary system address decoding circuit utilized by processing units in FIG. 2.
Figure 7:
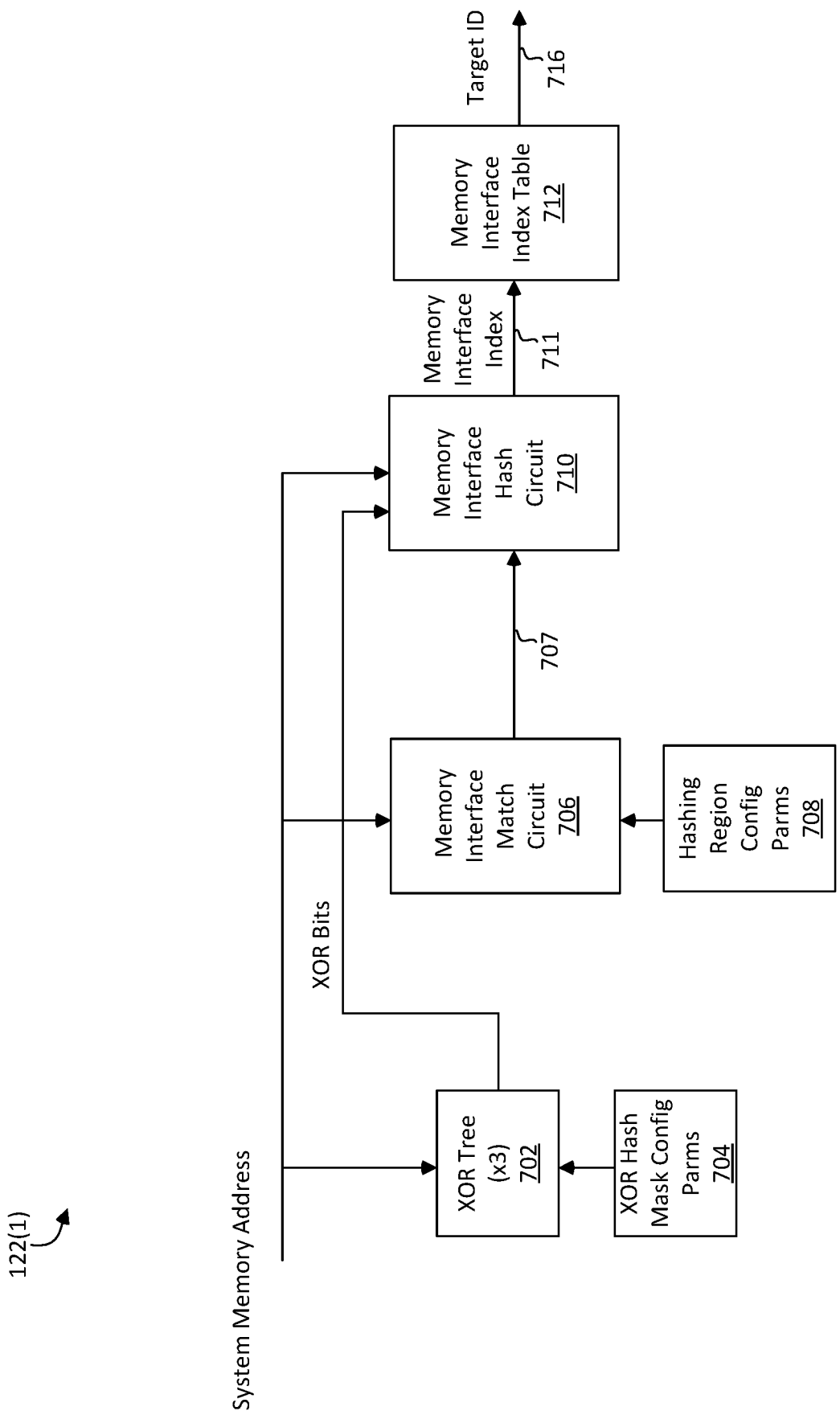
FIG. 7 is a block diagram of an exemplary system address decoding circuit utilized by shared cache memories in FIG. 2 when a memory request misses in a shared cache memory.

For each hashing region 402(1)-402(8), a unique hashing circuit, as will be described in more detail in FIG. 6 and FIG. 7, is utilized to decode a system memory address since the discovered configuration for each hashing region 402(1)-402(8) is unique with respect to the number of physical regions over which system memory addresses are interleaved or the number of shared memory resources in a physical region in which system memory addresses are interleaved. Thus, system memory addresses that fall in a respective hashing region are interleaved across the unique combination of one or more physical regions and shared memory resources within a physical region. For example, hashing region 402(1) employs a hashing circuit that decodes system addresses that are interleaved across multiple chip sockets, and hashing region 402(2) employs a hashing circuit that decodes system addresses that are interleaved across four physical regions 202(1)-202(4). Due to the overlap of memory interface interleave regions 400(1)-400(4) and interleave physical regions 300(1)-300(4), hashing region 402(3) employs a hashing circuit that decodes system addresses which are interleaved across three physical regions 202(1)-202(3) and four memory interface pairs 116(1)-116(8), while hashing region 402(4) employs a different hashing circuit that decodes system addresses which are interleaved across the same three physical regions 202(1)-202(3) and three memory interface pairs 116(1)-116(6). Hashing region 402(5) employs a hashing circuit that decodes system addresses which are interleaved across two physical regions 202(1)-202(2) and three memory interface pairs 116(1)-116(6), while interleave memory region 402(6) employs a different hashing circuit that decodes system addresses which are interleaved across the same two physical regions 202(1)-202(2) and two memory interface pairs 116(1)-116(4). Hashing region 402(7) employs a hashing circuit that decodes system addresses which are interleaved across one physical region 202(1) and two memory interface pairs 116(1)-116(4), while interleave memory region 402(6) employs a different hashing circuit that decodes system addresses which are interleaved across the same one physical region 202(1) and one memory interface pair 116(1)-116(2).

Since each hashing region 402(1)-402(8) defines a unique combination of physical regions, shared cache memory resources, and memory interfaces over which to interleave memory addresses, the system decoding circuit 122 may need to ensure that the first address in a hashing region decodes the system address to target the resource (i.e., shared cache memory resource or memory interface) which is the next sequential resource from the last targeted resource by the last address in the lower adjacent hashing region. To do this, at boot up, the processor-based system 100 determines a smoothing factor, $S_f$, that will be utilized in the respective hashing circuits associated with hashing regions 402(1)-402(8). During boot up, the processor-based system 100 performs a trial hashing process for each hashing circuit associated with hashing regions 402(2)-402(8) to calculate a smoothing factor for hashing regions 402(2)-402(8). The trial hashing process for hashing region 402(2), for example, includes applying the highest system memory address of the lower adjacent hashing region, hashing region 402(1) for example, to the hashing circuit associated with hashing region 402(1) to determine the first targeted resource. The trial hashing process for hashing region 402(2) also includes applying the lowest system memory address hashing the lowest address of hashing region 402(2) to the hashing circuit associated with hashing region 402(2) to determine the second targeted resource. If the second targeted resource is the next sequential resource as determined by the established order of targeted resources at boot up after the first targeted resource, the smoothing constant will be zero (0). Otherwise, the smoothing factor is calculated by taking the absolute difference between the unique identifiers of second and first targeted resources. For example, if the first targeted resource is shared cache memory resource 108(1) and the second targeted resource is shared cache memory 108(7), the smoothing constant would be equal to six (6).

Within a hashing region, if any of the sets of the targeted resources (physical region, shared cache memory resources, memory interfaces) is not a power of two (2), a correction constant is utilized by the corresponding hashing circuit when hashing for a targeted resource in the set of targeted resources that is not a power of two (2) to ensure that each of the targeted resources within the set will be sequentially targeted for each sequential address within the hashing region. During boot up, the processor-based system 100 performs a correction factor trial hashing process for each hashing region 402(1)-402(8) to calculate a correction factor for any of the sets of targeted resources in the respective hashing regions 402(1)-402(8) where the number of targeted resources in the set is not a power of two (2). During boot up, the correction factor trial hashing process determines a correction factor for addressing three physical regions and a correction factor for addressing six memory interfaces. To calculate the correction factor for three physical regions, the processor-based system 100 solves for $C_f$, the correction factor, in the following formula:

$$D * C_f \bmod(N_r) = 1 \text{ where}$$

D is the distance between two targeted resources in the same set for two sequential system memory addresses, and $N_r$ is the number of targeted resources in the same set.

D is determined by running the corresponding hashing circuit of a hashing region for two adjacent system memory addresses to yield two targeted resources in the set. The distance, D, is calculated by taking the absolute difference between the unique identifiers of two targeted resources.

For example, as stated above, hashing region 402(6) employs a unique hashing circuit that decodes system addresses which are interleaved across three physical regions 202(1)-202(3) and two memory interface pairs 116(1)-116(4) (in other words, four (4) memory interfaces). The set of targeted resources that are not both a power of two are both the physical regions (3) and the memory interfaces (4). The correction factor trial hashing process, in this example, will run the hashing circuit corresponding to hashing region 402(6) twice for two consecutive system memory addresses which target two physical regions and will assume a correction factor Cr having a value of 1. Assuming the two resulting physical regions are physical region 202(1) and physical region 202(3), the distance, D, would be two (2). Since there are three physical regions in the set, $N_r$ would be 3. Solving for $C_f$, Cr would equal two (2). This value for $C_f$ is then used in the hashing circuit when targeting a physical region in hashing region 402(6). The correction factor trial hashing process, in this example, will run the hashing circuit twice corresponding to hashing region 402(6) for two consecutive system memory addresses which target two memory interfaces regions and will assume a $C_f$ having a value of 1. Assuming the two resulting memory interfaces are memory interface 116(1) and memory interface 116(4), the distance, D, would be three (3). Since there are four memory interfaces in the memory interface set in hashing region 402(6), $N_r$ would be 4. Solving for $C_f$, $C_f$ would equal one (1). This value for $C_f$ is then used in the hashing circuit when targeting a physical region in hashing region 402(6).

How the unique hashing circuits utilize the smoothing factor and the correction factor will be discussed in FIG. 13.

When routing a memory request, a PU is configured to determine a target identifier for the memory request having a system memory address so the memory request can be routed first to the appropriate shared cache memory resource. The system address decoding circuit 122(0) determines which unique hashing circuit to use to decode the system memory address based on the hashing region 402(1)-402(8) in which the system memory address resides. The selected hashing circuit is used to decode the physical region for which the memory request is destined and the shared cache memory resource and the memory interface within the determined physical region. The term "unique hashing circuit" as used herein is agnostic to a particular implementation. Hashing circuits may be unique by having different logic circuitry or, if the hashing circuits have the same or common logic circuitry, may be unique by having unique parameters inputted to a respective hashing circuit. For example, the hashing circuits as described further in FIGS. 6-7 may have the same logic circuitry as described in FIG. 13 but vary based on the parameters inputted to the respective hashing circuits.

Figure 5:
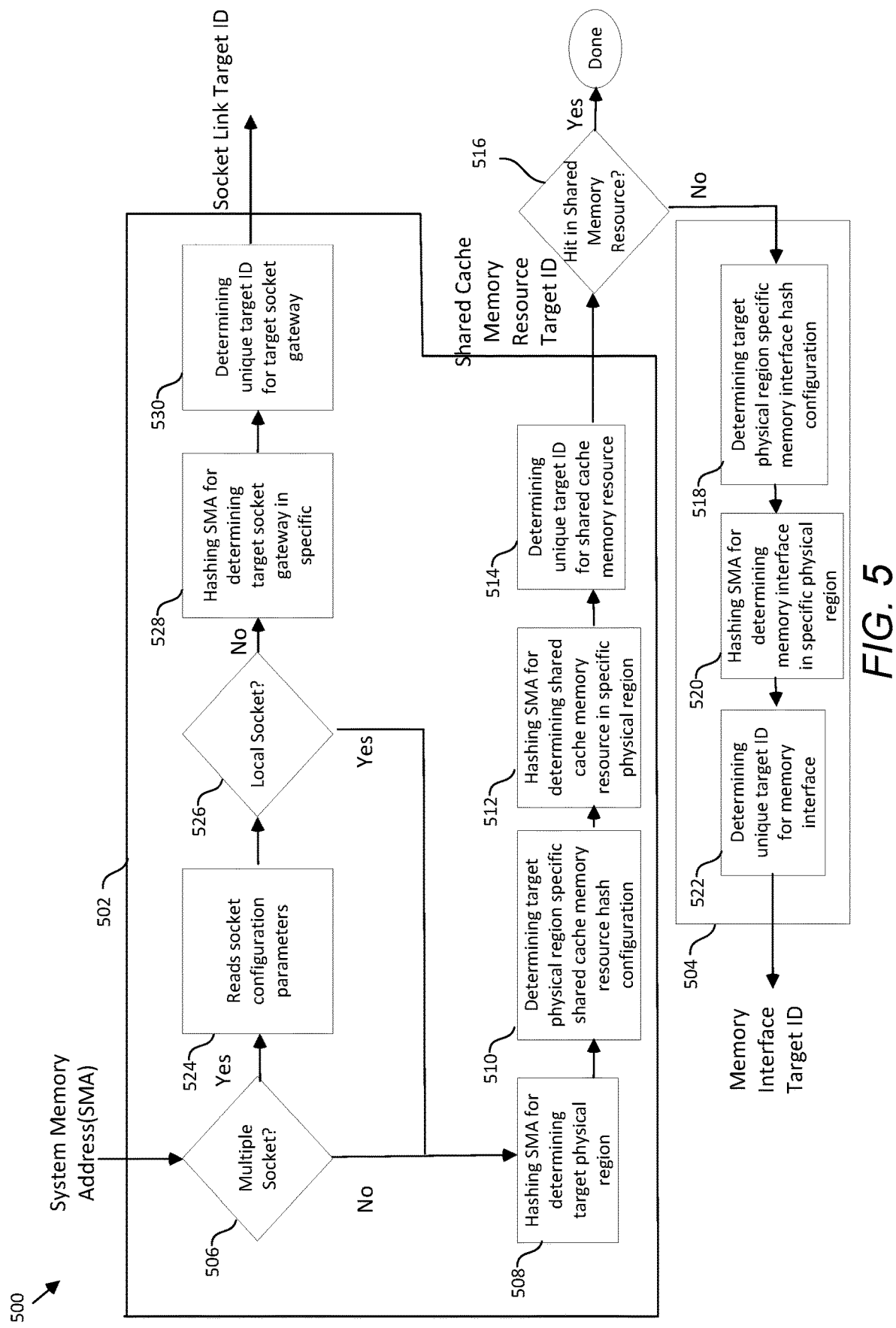
FIG. 5 is an exemplary flowchart for decoding a system memory address of a memory request in accordance with interleaving memory addresses across physical regions and across shared memory resources, including, but not limited to, the shared memory resources in the IC chip in FIGS. 1 and 2.

FIG. 5 is an exemplary flowchart for decoding a system memory address of a memory request in accordance with interleaving memory addresses across physical regions and across shared memory resources within a physical region. Process 500 involves two levels of system memory address decoding hierarchies. A first level of system memory address decoding 502 is addressed by the system address decoding circuit 122(0) at a PU 104(0)-104(N) which performs blocks 506-514 and optional blocks 524-530, if the SoC 200 is deployed with multiple sockets. A second level of system address decoding 504 is addressed by the system address decoding circuit 122(1) at a shared cache memory resource 108(A)-108(Y) which performs blocks 518-522. At block 506, the process 500 receives a system memory address, determines in which hashing region 402(1)-402(8) the system memory address resides, and determines whether the processor-based system 100 deploys a multiple-socket system. If not, the process 500 proceeds to block 508. At block 508, the process 500 particularly configures a hash circuit based on the specific hashing region 402(1)-402(8) in which the system memory address resides and hashes the system memory address to determine the target physical region for which the memory request is destined. At block 510, the process 500 particularly configures the hash circuit, which is specific to the target physical region, based on the hashing region 402(1)-402(8) in which the system memory address resides and proceeds to block 512. At block 512, the process 500 hashes the system memory address to determine which shared cache memory resource should be targeted in the specific target physical region. At block 514, the process 500 determines the unique target identifier of the targeted shared cache memory resource and submits the memory request to the interconnect bus 114 which routes the memory request to the selected shared cache memory resource. In one embodiment, a look-up table is used to convert a local reference of the shared cache memory resource from block 512 to a unique target identifier. At block 516, the targeted shared cache memory resource determines whether there is a "hit." If there is, the memory request is serviced by the selected shared cache memory resource. If there is a "miss," the process 500 proceeds to block 518. At block 518, the process 500 determines regional specific hashing parameters for finding the appropriate memory interface to route the memory request. The process 500 particularly configures the hash circuit based on the regional specific hashing parameters. At block 520, the process 500 hashes the system memory address to determine the appropriate memory interface in the specific physical region that should be targeted. At block 522, the process 500 determines the unique target identifier of the targeted memory interface and directs the memory request to the coupled system memory module. In one embodiment, a look-up table is used to convert a local reference of the memory interface from block 520 to a unique target identifier.

Returning to block 506, if the processor-based system 100 is deployed in a multiple-socket configuration, the process 500 proceeds to block 524. At block 524, the process 500 consumes the socket configuration parameters that were discovered at boot up. At block 526, the process 500 hashes the system memory address to determine if the system address should be destined to a shared cache memory resource on the chip in which the memory request originated. The process 500 makes this decision either by determining that the socket configuration parameters indicate that the SoC 200 is deployed in a one-socket configuration or, if the SoC 200 is deployed in a multiple-socket configuration, determining the socket number in the system memory address. If the system memory address is destined for a shared cache memory resource in the SoC 200, the process 500 proceeds to block 508. If not, the process 500 proceeds to block 528 to hash the system memory address according to the hashing circuit associated with the hashing region 402(1) to determine to which socket gateway 120(A)-120(H) to route the memory request. At block 530, the process 500 utilizes a look-up table to find the unique target identifier associated with the selected socket gateway 120(A)-120(H) and submits the memory request to the interconnect bus 114 for routing to the selected socket gateway 120(A)-120(H).

Figure 8:
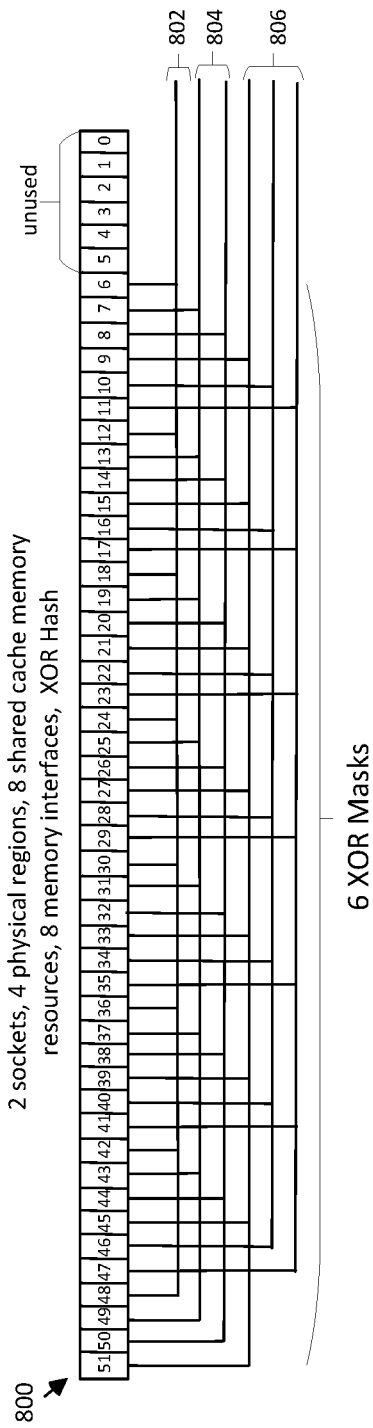
FIG. 8 is an exemplary XOR tree circuit for a system memory address which resides in an address range that spans two sockets, four (4) physical regions in each socket, eight (8) shared cache memory resources in each physical region, and eight (8) memory interfaces in each physical region.

FIG. 6 is a block diagram of an exemplary system address decoding circuit 122(0) utilized by the PUs 104(1)-104(20) in FIG. 2. Blocks 602-618 are utilized when the SoC 200 is deployed in a single-socket configuration or in a multiple-socket configuration. Blocks 620-630 are optional and utilized only when the SoC 200 is deployed in a multiple-socket configuration. XOR tree circuit 602 is a set of XOR gates which are configured to XOR particular bits in a system memory address to decode a socket, a physical region, a shared cache memory resource, and a memory interface based on the hashing region 402(1)-402(8) in which the system address resides. For example, FIG. 8 illustrates six XOR trees for decoding a system memory address which resides in the hashing region 402(1) which is associated with two sockets, four physical regions, eight shared cache memory resources, and eight memory interfaces. (XOR gates are shown for simplicity by connecting bits with horizontal lines.) For addresses in that region, bits 6, 12, 18, 24, 30, 36, 42, and 48 are XOR'd to determine a socket 802 from a system memory address 800. Bits 7, 13, 19, 25, 31, 37, 43, and 49 are XOR'd to determine the least significant bit of a physical region 804, and bits 8, 14, 20, 26, 32, 38, 44, and 50 are XOR'd to determine the most significant bit of the physical region 804. Bits 9, 15, 21, 27, 33, 39, 45, and 51 are XOR'd to determine the least significant bit of a shared cache memory resource 806, bits 10, 16, 22, 28, 34, 40, and 46 are XOR'd to determine the middle bit of the shared cache memory resource 806, and bits 11, 17, 23, 29, 35, 41, and 47 are XOR'd to determine the most significant bit of the shared cache memory resource 806.

Figure 9:
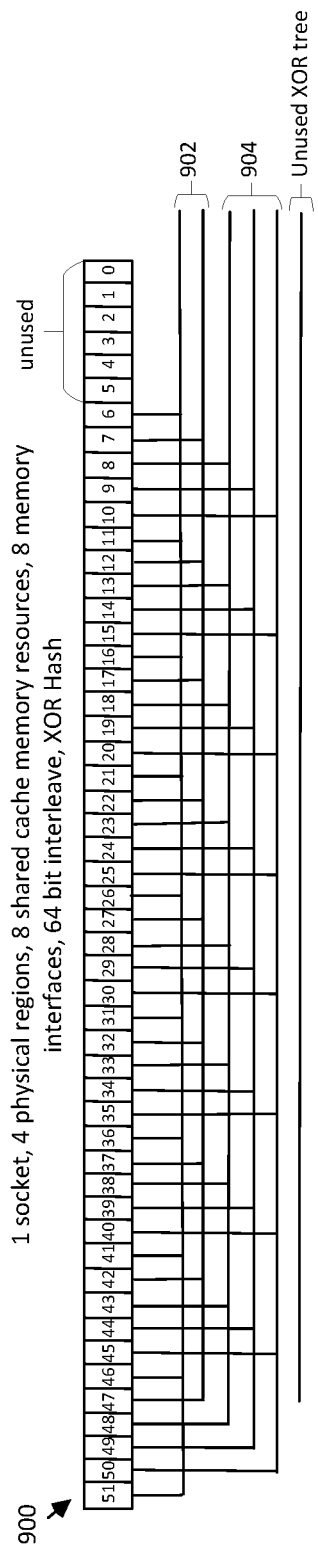
FIG. 9 is an exemplary XOR tree circuit in FIGS. 6 and 7 for a system memory address which resides in an address range that spans one socket, four (4) physical regions in the socket, eight (8) shared cache memory resources in each physical region, and eight (8) memory interfaces in each physical region.

In another example, FIG. 9 shows five XOR trees for decoding a system memory address 900 which resides in the hashing region 402(2) which is associated with one socket, four physical regions, eight shared cache memory resources, and eight memory interfaces. For addresses in that region, bits 6, 11, 16, 21, 26, 31, 36, 41, 46, and 51 are XOR'd to determine the least significant bit of a physical region 902 and bits 7, 12, 17, 22, 27, 32, 37, 42, and 47 are XOR'd to determine the most significant bit of the physical region 902. Bits 8, 13, 18, 23, 28, 33, 38, 43, and 48 are XOR'd to determine the least significant bit of a shared cache memory resource 904, bits 9, 14, 19, 24, 29, 34, 39, 44, and 49 are XOR'd to determine the middle bit of the shared cache memory resource 904, and bits 10, 15, 20, 25, 30, 35, 40, 45, and 50 are XOR'd to determine the most significant bit of the shared cache memory resource 904. The XOR tree circuit 602 of FIG. 6 is configurable to address multiple combinations of XOR bits to decode aspects of a system memory address. The XOR tree circuit 602 determines which subset of XOR gates to apply to what bits of the system memory address by reading XOR configuration parameters 604 which were discovered at boot up.

A physical region match circuit 606 determines which hashing region in which the system memory address resides by consuming regional configuration parameters 608 and particularly configures regional hash circuit 610 how to determine to which physical region the system memory address should be routed. The regional configuration parameters 608 also include the number of available shared cache memory resources per physical region. For example, at boot up, the configuration parameters will hold information indicating to what extent, if any, certain cache memories 108(A)-108(Y) are unavailable in each physical region 202(1)-202(4). In case of a multiple-socket configuration, the physical region match circuit 606 indicates whether the hashed region is configured for multi-socket interleaving by referring to the parameters associated with the hashing region 402(1)-402(8) in which the system address resides. The physical region match circuit 606 also forwards shared cache memory resource hashing configuration parameters for each physical region to particularly configure regional hash circuit 610. The physical region match circuit 606 may also include parameters for smoothing factors or correcting factors that may be utilized in the hashing regions 402(1)-402(8). See the discussion on smoothing or correcting factor calculations in connection with the description of FIG. 4.

In response to the physical region match circuit 606 signaling, a regional hash circuit 610 determines whether, and to what extent, to utilize the output of the XOR tree circuit 602 or decode specific bits of the system memory address to determine the specific physical region to direct the memory request carrying the system memory address. FIG. 10 is an example of simply decoding specific bits from a system memory address. FIG. 10 is an exemplary bit hash circuit that can be used in FIG. 6 and FIG. 7 for a system memory address which resides in an address range that spans one socket, four physical regions in the socket, eight shared cache memory resources in each physical region, and eight memory interfaces in each physical region. In this example, a hashing circuit 1000 determines a physical region 1002 by decoding bits 6-7 and a specific shared cache memory resource 1004 by decoding bits 8-10. Since FIG. 10 addresses a one-socket hashing region, no bits are decoded for a socket.

Additionally, the regional hash circuit 610 performs smoothing or correcting calculations, if needed when decoding a system memory address to ensure interleaving memory addresses due to multiple hashing regions 402(1)-402(8). The application of these factors will be discussed in connection with FIG. 13. The regional hash circuit 610 forwards the specific physical region index for which the memory request is destined to a multiplexer (mux) 612, a mux 616 and a shared cache memory resource index table 614. The mux 616 which receives the number of available shared resources in each physical region. The mux 616 outputs the appropriate number of available shared cache memory resources in the targeted physical region to a shared cache memory resource hash circuit 618. The shared cache memory resource hash circuit 618 determines whether, and to what extent, to utilize the output of the XOR tree circuit 602 or decodes specific bits of the system memory address to determine an index 619 of the specific shared cache memory resource in the targeted physical region to direct the memory request. For example, if the system memory address targets physical region 202(1) and there are eight available shared cache memories 108(1)-108(8), the shared cache memory resource hash circuit 618 hashes the system memory address to identify which one of the eight available cache memories to which the memory request should be targeted. Additionally, the shared cache memory resource hash circuit 618 performs smoothing or correcting calculations, if needed when decoding a system memory address to ensure interleaving memory addresses due to multiple hashing regions 402(1)-402(8). See the discussion on smoothing or correcting calculations in connection with the description of FIG. 13.

The shared cache memory resource index table 614 receives the index 619 of the shared cache memory resource from the shared cache memory resource hash circuit 618 and the targeted physical region from the regional hash circuit 610 and looks up the index 619 to a unique target identifier 621 for the targeted shared cache memory resource. If the SoC 200 is deployed in a one-socket configuration, the shared cache memory resource index table 614 forwards the memory request with the unique target identifier 621 of the targeted shared cache memory resource to the interconnect bus 114 to route the memory request to the targeted shared cache memory resource. If the SoC 200 is deployed in a multiple-socket configuration, the unique target identifier 621 for the targeted shared cache memory resource is forwarded to a mux 620.

In a multiple-socket configuration, a gateway hash circuit 622 receives input gateway configuration parameters 624 which were determined at boot up indicating the number of available socket gateways 120(A)-120(H) on the SoC 200. The gateway hash circuit 622, as well as the shared cache memory resource hash circuit 618, determines whether, and to what extent, to utilize the output of the XOR tree circuit 602 or, alternatively, decodes specific bits to obtain an index 625 of the specific socket gateway to direct the memory request. The specific socket gateway is forwarded to a gateway index table 626 to look up the index 625 for the specific socket gateway to determine a unique gateway target identifier 627.

A socket hash circuit 628 receives the number of sockets in which the SoC 200 is deployed from socket configuration parameters 630. The socket configuration parameters 630 are determined during boot up. The socket hash circuit 628 determines whether the memory request is destined to a shared cache memory resource on the SoC 200 or a remote SoC connected through a socket gateway 120(A)-120(H). The socket hash circuit 628 determines whether to use the output of the XOR tree circuit 602 to determine the specific socket to or decode specific bits of the system memory address to obtain the specific socket to direct the memory request carrying the system memory address and sends a select signal 629 to the mux 620 to direct whether the memory request should be sent to the target gateway or a local shared cache memory resource.

FIG. 7 is a block diagram of an exemplary system address decoding circuit 122(1) utilized by the shared cache memory resources in FIG. 2 when a memory request misses in a shared cache memory resource. Note that at this point, the memory request is at the specific shared cache memory resource in a specific physical region on the SoC 200 and the specific shared cache memory resource has to direct the memory request to one of the available memory interfaces in the same physical region. For example, assuming the memory request missed in shared cache memory resource 108(1) in FIG. 2, the shared cache memory resource 108(1) invokes its system address decoding circuit to determine the unique target of the proper memory interface, one of memory interfaces 118(1)-118(8).

An XOR tree circuit 702 is a set of XOR gates which are configured to XOR particular bits in a system memory address to decode a memory interface based on the hashing region 402(1)-402(8) in which the system memory address resides. Since there are a maximum of eight memory interfaces per physical region in an exemplary SoC 200, three XOR trees are determined to XOR three sets of bits from the system memory address to decode the memory interface index. Additionally, if there are the same number of available memory interfaces as there are available cache memories in the same physical region, the same bits used for decoding a shared cache memory resource can be used for decoding a memory interface. See FIGS. 8 and 9 where the same three bits for the shared cache memory resource 806, 904 are used for decoding a memory interface. The XOR tree circuit 702 determines which subset of XOR gates to apply to what bits of the system memory address by reading XOR configuration parameters 704 which were discovered at boot up.

A memory interface match circuit 706 receives the output of the XOR tree circuit 702 and the system memory address. Based on hashing region configuration parameters 708, the memory interface match circuit determines which hashing region 402(1)-402(8) in which system memory address resides and sends configuration parameters 707 describing how to calculate the index for the memory interface to a memory interface hash circuit 710. The hashing region configuration parameters 708 will also include information regarding the number of available memory interfaces in each physical region, the boundaries for each hashing region 402(1)-402(8), and any smoothing or correction calculations that may be utilized in the hashing regions 402(1)-402(8). As such, the memory interface match circuit 706 will forward those configuration parameters to the memory interface hash circuit 710. The memory interface hash circuit 710 utilizes the configuration parameters 707 and either the XOR output from the XOR tree circuit 702 or decodes specific bits of the system memory address to determine an index 711 for the specific memory interface to route the memory request. A memory interface index table 712 receives the memory interface index 711 for the specific memory interface and looks up a corresponding unique target identifier 716. The memory interface index table 712 submits the unique target identifier 716 to the interconnect bus 114 for routing to the associated memory interface. In scenarios where the number of available shared cache memory resources do not equal the number of memory interfaces, the memory interface index table 712 may be unique for each available shared cache memory resource in the physical region, and the memory interface index 711 is a decoded address which is used to look up in the memory interface index table 712 to retrieve the target identification of the targeted memory interface. See the description in connection with FIG. 14 for more detail. The memory interface, in turn, routes the memory request to its associated system memory module 118(A)-118(N).

The hashing circuits 610, 618, 622, and 710 utilize XOR trees as input rather than bitwise decoding of the system memory address when, for a hashing region, the number of all entities (i.e., physical regions, available shared cache memory resources, and available memory interfaces) in the multi-level hierarchy 502 and 504 are a power of two (2). The hashing circuits 610, 618, 622, and 710 are more complicated to decode system memory addresses which are interleaved over a configuration of entities (i.e., physical regions, available shared cache memory resources, and memory interfaces within a physical region) when any one of the number of physical regions, the number of available shared resources within a physical region, or the number of memory interfaces within the physical region are not a power of two (2). FIG. 11 is an exemplary hashing circuit in FIG. 6 and FIG. 7 for a system memory address which resides in an address region that spans one socket, three physical regions in the socket, eight shared cache memory resources in each physical region, and eight memory interfaces in each physical region. Since the number of shared cache memory resources and memory interfaces are the same and are both a power of two (2), exemplary hashing circuit 1100 decodes bits 6-8 1102 to find the targeted shared cache memory resource and decodes these same bits 6-8 1102 on a cache miss to find the targeted memory interface. However, since the address range spans three physical regions, the hashing circuit 1100 applies a mod 3 operator circuit 1104 to bits 6-51 to calculate the targeted physical region.

Additionally, FIG. 12 is an exemplary hashing circuit in FIG. 6 and FIG. 7 for a system memory address which resides in an address range that spans one socket, three physical regions in the socket, seven shared cache memory resources in a physical region, and six memory interfaces in a physical region. As a result of the number of physical regions, shared cache memory resources, and memory interfaces not being a power of two (2), exemplary hashing circuit 1200 applies a mod 3 circuit 1202 to bits 6-51 and applies a correction and smoothing factor circuit (ckt) 1204 to the result of the mod 3 circuit 1202 to calculate the specific physical region. Exemplary hashing circuit 1200 also applies a mod 7 circuit 1206 to bits 6-51 to calculate the shared cache memory resource. Correction and smooth circuit calculations were discussed above in connection with FIG. 4.

Since the number of memory interfaces has a shared factor of three (3) with the number of physical regions, a mod 3 operator alone cannot be used to decode a memory interface. If a mod 3 operator or a mod 6 operator were used, not all system addresses in this hashing region would be appropriately hashed to match the interleaving of sequential memory addresses across the sequential memory interfaces in the specified physical region causing the system memory to which each of the memory interfaces are coupled to be sparsely populated. To avoid that problem, another module circuit is utilized to apply against the system memory address to calculate the specific memory interface in the case of cache miss at the shared cache memory resource. Doing so ensures that sequential system memory addresses within the hashing region 402(1)-402(8) are sequentially distributed across available memory interfaces on each sequential system memory address on a cache miss at the shared cache memory resource. In this case, rather than merely using a modular operation circuit that matches a common factor with another targeted resource, the hashing circuit 1200 applies a distinguishing factor circuit 1208. The distinguishing factor circuit 1208, for this example, includes a mod 9 div 3 circuit 1210, a first correction and smoothing circuit 1212, an add/mod 3 circuit 1214, a second correction and smoothing circuit 1216, and a concatenate circuit 1218. The mod 9 div 3 circuit 1210 performs a modular 9 operation on bits 6-51 and a div 3 operation on the result. Correction and smoothing circuits 1212, 1216 perform correction and smoothing calculations in the previous circuit's calculation and are described in connection with FIG. 4. The add/mod 3 circuit 1214 adds bit 6 to the result of the first correction and smoothing circuit 1212 and then performs a mod 3 operation and forwards its output to the second correction and smoothing circuit 1216. The concatenate circuit 1218 concatenates bit 6 to the result of the second correction and smoothing circuit 1216 to calculate the memory interface. The distinguishing factor circuit 1208 resolves to an available memory interface index which is sequential to a last available memory interface mapped from the last address in a lower adjacent hash region. The memory interface index for the targeted memory interface resource is used as input to the memory interface index table 712 to obtain the target id to which a memory request is sent. Other distinguishing factor calculations which address different numbers of physical regions, shared cache memory resources, or memory interfaces are deployed in the system address decoding circuit 122(0) and are discussed in connection with FIG. 13.

A unique hashing circuit for each hashing region that can address incomplete good die manufacturing or varying capacities of system memory modules to direct memory requests to targeted entities such as physical regions, shared cache memory resources, and memory interfaces while addressing smoothing and correction issues may be implemented in various ways. In this regard, FIG. 13 is flowchart for the logic process 1300 of an exemplary aggregated hash circuit which may be utilized by one or more of the hash circuits described in FIGS. 6 and 7 that hashes system memory addresses based on the factor of the number of targeted resources in a set of targeted resources when the set of targeted resources is a set of physical regions, shared cache memory resources, or memory interfaces. This flexibility is deployed to handle incomplete good die manufacturing or various combinations of system memory modules coupling to less than the maximum number of available memory interfaces. For example, it may be determined during manufacturing that some shared cache memory resources within specific quadrants are not available. For example, although the SoC 200 was designed to have 64 shared cache memory resources 108(1)-108(64), due to a manufacturing issue, shared cache memory resources 108(1), 108(9)-108(10), 108(17)-108(19) and 108(25)-108(28) were defective and, thus, unavailable. To continue to use the SoC 200, the system memory address decoding circuit 122(0) deploys a hash circuit to appropriately hash a system memory address to support seven shared cache memory resources in the physical region 202(1), six shared cache memory resources in the physical region 202(2), five shared cache memory resources in the physical region 202(3), and four shared cache memory resources in the physical region 202(4). Similarly, even if the memory resources were completely operable when manufacturing the SoC 200, a device manufacturer may not completely populate the system memory modules 118(A)-118(N) into the available memory interfaces 116(A)-116(N). In this case, the system memory address decoding circuit 122(1) deploys the combined hash circuit to appropriately hash a system memory address to support various combinations that a device manufacturer may use in plugging in system memory modules.

The aggregated hash circuit can be deployed at both the first and second levels of system memory address decoding (i.e., 502 and 504) in system address decoding circuit 122(0) or a shared system address decoding circuit 122(1). Although applicable to all targeted resources, the discussion of logic process 1300, for convenience, will use the example of a system memory address being directed to a shared cache memory resource for a particular hashing region.

At block 1302(1), if the number of shared cache memory resources does not have a factor of three (3), the logic process 1300 proceeds to block 1302(2). If the number of shared cache memory resources has a factor of three, the logic process 1300 proceeds to block 1304. At block 1304, the logic process 1300 determines if there is another targeted resource that has a factor of three, e.g., a physical region in order to ensure that the hashing region for this hashing circuit completely populates the targeted resources in the hashing region. If there are other targeted resources within the hashing region that have a factor of three, say for example a physical region, the logic process 1300 proceeds to block 1306. At block 1306, the logic process 1300 performs a mod 9 div 3 on the system address and proceeds to block 1312. At block 1312, the logic process 1300 performs a modulo add of smoothing factor $S_f$ to the result from block 1306 and proceeds to block 1314. At block 1314, the logic process 1300 saves the result from block 1312 in case there are other factors of the number of shared cache memory resources that need to be addressed later in the logic process 1300 (e.g., if there are six shared cache memory resources in the hashing region) and proceeds to block 1302(3).

Returning to block 1304, if there are no other targeted resources within the hashing region that have a factor of three, the logic process 1300 proceeds to block 1308. At block 1308, the logic process 1300 performs a mod 3 calculation on the system memory address and proceeds to block 1310. If the number of shared cache memory resources had a factor of five (5) or seven (7), the logic process 1300 would perform a mod 5 or mod 7, respectively, on a system memory address at block 1308 which will occur if the logic process 1300 proceeds through block 1302(2) before block 1308. At block 1310, the logic process 1300 performs a modulo multiply of the result of block 1308 by correction factor $C_f$ and then performs a modulo three (3), five (5), or seven (7) operation on the result before proceeding to block 1312 depending on the factor of the number of shared cache memory resources. At block 1312, the logic process 1300 performs a modulo add of smoothing factor $S_f$ to the result from block 1310 and then a modulo three (3), five (5), or seven (7) of the result based on the factor of the shared cache memory resources. At block 1314, the logic process 1300 saves the result from block 1312 in case there are other factors of the number of shared cache memory resources that need to be addressed later in the logic process 1300 and proceeds to block 1302(3).

At block 1302(3), the logic process 1300 determines if the number of shared cache memory resources in the hashing region has a factor of two (2), four (4), or eight (8). If so, the logic process 1300 proceeds to block 1316. At block 1316, the logic process 1300 determines whether to use select bits in the system memory address or XOR select bits in the system memory address to find the target index of the shared cache memory address. The logic process 1300 makes this determination by consuming the configuration parameters which indicate the number of other resources in the hashing region such as physical regions and memory interfaces. If any of the sets of targeted resources are not a power of two (2), the logic process 1300 proceeds to block 1318 to select particular bits in the system address bits to identify a shared cache memory resource. If each of the sets of targeted resources are a power of two (2) (See FIG. 8, for example), the logic process 1300 proceeds to block 1320 to XOR selected bits to identify a shared cache memory resource. At block 1322, the logic process 1300 performs a modulo multiply of the results of either block 1318 or 1320 by correction factor $C_f$ and then modulo two (2), four (4), or eight (8) of the result depending on the factor of shared cache memory resources that caused the logic process 1300 to exit block 1302(3). At block 1324, the logic process 1300 performs a modulo add of smoothing factor $S_f$ to the result from block 1322 then modulo two (2), four (4), or eight (8) of the result depending on the factor of shared cache memory resources that caused the logic process 1300 to exit block 1302(3). At block 1326, the logic process 1300 saves the result from block 1324 in case there are other factors of the number of shared cache memory resources that need to be addressed from other paths in the logic process 1300 and proceeds to block 1302(4).

At block 1302(4), the logic process 1300 determines if there is only one shared cache memory resource in the hashing region by consuming configuration parameters. If there is one shared cache memory resource, the logic process 1300 proceeds to block 1328 and returns index zero (0) for the shared cache memory resource which is received by the shared cache memory resource index table 614. If there is more than one shared cache memory resource, the logic process 1300 proceeds to block 1302(5).

At block 1302(5), the logic process 1300 determines if the number of shared cache memory resources in the hashing region has a factor of six (6) by consuming configuration parameters. If it does, the logic process 1300 proceeds to block 1330 to add the first result calculated in block 1314 (i.e., factor of three (3) result) to the second result calculated in block 1326 (i.e., factor of two (2) result) and then perform a mod 3 operation on the result. The logic process 1300 proceeds to block 1332 where it concatenates the second result to the output of block 1330. At block 1334, the logic process 1300 returns the concatenated result from block 1332 as the index for the targeted shared cache memory resource which is used as input to the shared cache memory resource index table 614. Returning to block 1302(5), if the number of shared resources does not have a factor of six, the logic process 1330 proceeds to block 1336 and returns the target index previously calculated for the factor of the shared cache memory resources. For example, if the shared cache memory resources had a factor of three (3), five (5), or seven (7) and not six (6), the first result would be returned as the target index to shared cache memory resource index table 614. In another example, if the shared cache memory resources had a factor of two (2), four (4), or eight (8) and not six (6), the second result would be returned as the target index to shared cache memory resource index table 614.

Individual blocks 1310 and 1322 are generally referred to as "modulo multiply operations." Individual blocks 1312 and 1324 are generally referred to as "modulo add operations."

Figure 13:
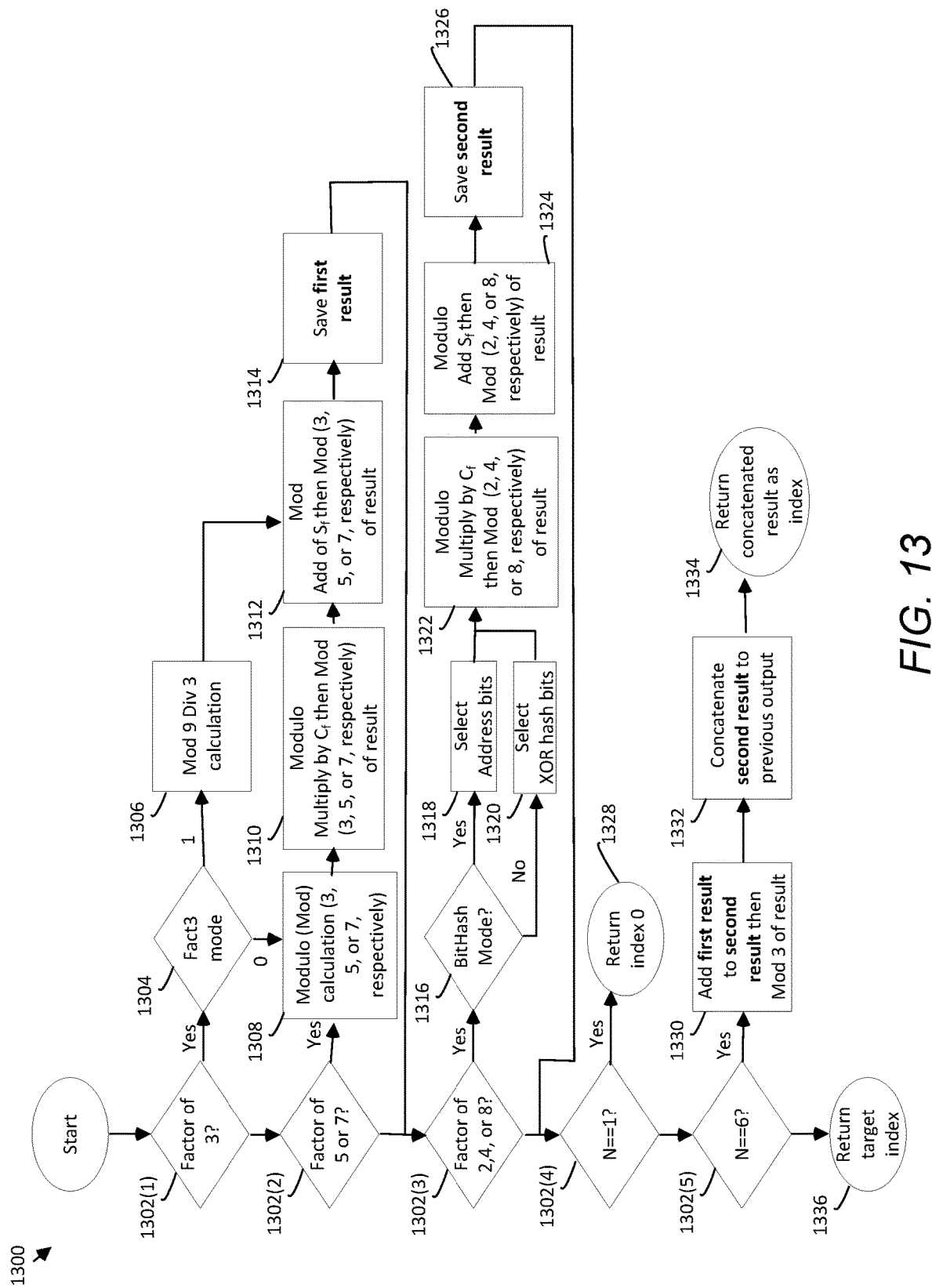
FIG. 13 is flowchart for the logic process of an exemplary aggregated hash circuit which may be utilized by one or more of the hash circuits described in FIGS. 6 and 7 that hashes system memory addresses based on the factor of the number of targeted resources in a set of targeted resources when the set of targeted resources is a set of physical regions, shared cache memory resources, or memory interfaces.

Although FIG. 13 was described for convenience with respect to targeting a shared cache memory resource with a system memory address, FIG. 13 is also applicable to targeting socket gateways, physical regions, and memory interfaces. When utilizing socket gateways, the output of FIG. 13 is the index to the socket gateway which is input to the gateway index table 626. When utilizing physical regions, the output of FIG. 13 is the index to the physical region which is input to the shared cache memory resource index table 614. When utilizing memory interfaces, the output of FIG. 13 is the index to the memory interface which is input to the memory interface index table 712. Furthermore, the operations performed in block groupings 1306, 1308-1312, 1318-1324, and 1330-1332 may be implemented in individual correction circuits within the hashing circuit.

In some cases, either due to manufacturing or incomplete population of system memory modules into available memory interfaces, the ratio between available shared cache memory resources and available memory interfaces may not be 1:1. In those cases, the memory interface index table 712 for each shared cache memory resource in the same physical region is configured individually so that when viewed holistically as a combined table, the system memory addresses will decode system memory addresses that are interleaved of all the memory interfaces.

FIG. 14 is an exemplary configuration of a collection of memory index tables where each memory index table is unique for a shared cache memory resource in the same physical region to interleave system memory addresses across memory interfaces when the ratio of shared cache memory resources to memory interfaces is 7:8.

A memory index table 1400 is a collection of memory interface index tables 1402(1)-1402(7) where each memory interface index table 1402(1)-1402(7) is configured in a corresponding system memory address decoding circuit 122(1) in one of the seven available shared cache memory resources in the physical region. Each memory interface index table 1402(1)-1402(7) directs eight (8) memory address ranges to no more than two memory interfaces (MI). For example, the physical region 202(1) may have only seven (7) available shared cache memory resources 108(1)-108(7) and eight (8) available memory interfaces 116(1)-116(8) in the physical region 202(1) due to manufacturing issues. In this example, a shared cache memory resource 108(1) is configured to use memory interface index table 1402(1) when determining the target identification for one of the memory interfaces. When the shared cache memory resource 108(1) receives a system memory address that decodes to 0000, the memory interface index table 1402(1) directs the memory request to memory interface 1 (MI_1). When the shared cache memory resource 108(1) receives a system memory address that decodes to 3100, 2a00, 2300, 1C00, 1500, 0e00, or 0700, the memory interface index table 1402(1) directs the memory request to memory interface 0 (MI_0). Similarly, a shared cache memory resource, e.g., 108(2), is configured to use memory interface index table 1402(2). When the shared cache memory resource 108(2) receives a system memory address that decodes to 0800 and 0100, the memory interface index table 1402(2) directs the memory request to memory interface 2 (MI_2). When the shared cache memory resource 108(2) receives a system memory address that decodes to 3200, 2600, 2400, 1D00, 1600, or 0f00, the memory interface index table 1402(2) directs the memory request to memory interface 1 (MI_1). As one can see from the table, there is an equal number of entries in the collective memory index table 1400 for each of the seven memory interfaces to equally interleave the memory addresses from eight shared cache memory addresses to seven memory interfaces. In other words, the collection of memory index tables interleaves system memory addresses equally across one or more memory interfaces in the physical region 202(1)

Figure 15:
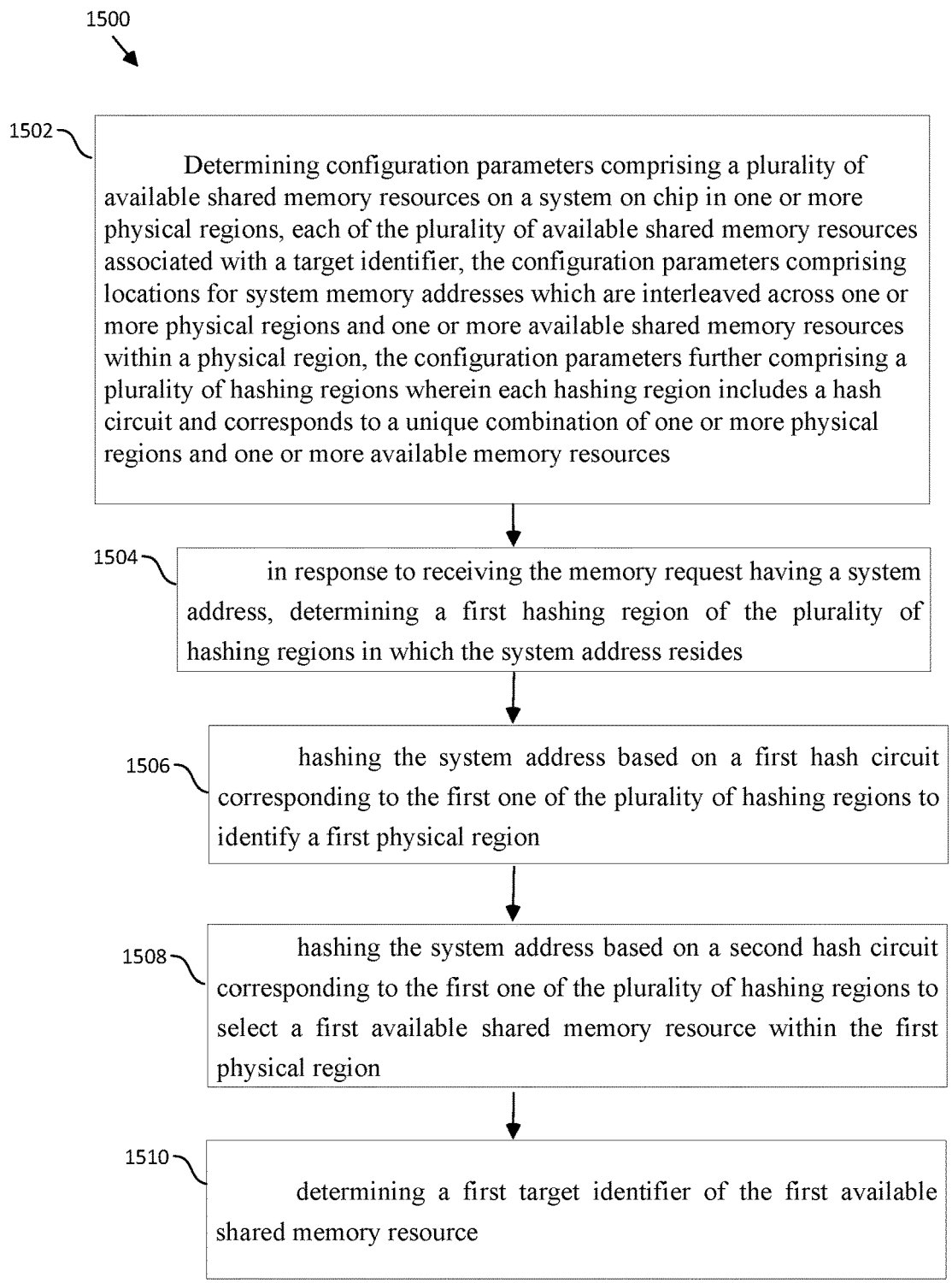
FIG. 15 is an exemplary flowchart for decoding a system memory address of a memory request in accordance with interleaving memory addresses across physical regions and across shared memory resources, including, but not limited to, the shared memory resources in the IC chip in FIGS. 1 and 2.

FIG. 15 is an exemplary flowchart for decoding a system memory address of a memory request in accordance with interleaving memory addresses across physical regions and across shared memory resources, including, but not limited to, the shared memory resources in the IC chip in FIGS. 1 and 2. Process 1500 begins at block 1502. At block 1502, process 1500 determines configuration parameters comprising a plurality of available shared memory resources on a SoC in one or more physical regions, each of the plurality of available shared memory resources associated with a target identifier. The configuration parameters comprise locations for system memory addresses which are interleaved across the one or more physical regions and one or more available shared memory resources within a physical region. The configuration parameters further comprise a plurality of hashing regions wherein each hashing region includes a hash circuit and corresponds to a unique combination of the one or more physical regions and the one or more available shared memory resources. At block 1504, in response to receiving the memory request having a system address, the process 1500 determines a first hashing region of the plurality of hashing regions in which the system address resides. At block 1506, the process 1500 hashes the system address based on a first hash circuit corresponding to the first hashing region to identify a first physical region. At block 1508, the process 1500 hashes the system address based on a second hash circuit corresponding to the first hashing region to select a first available shared memory resource within the first physical region. At block 1510, the process 1500 determines a first target identifier of the first available shared memory resource.

Electronic devices that include a processor-based system 100 for interleaving addresses across physical regions and across shared memory resources as described in FIGS. 1 and 2 and including the system address decoding circuits 122(0), 122(1) ("122") as described in FIGS. 6 and 7 and according to, but not limited to, any of the exemplary processes 500 and 1500, and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 16:
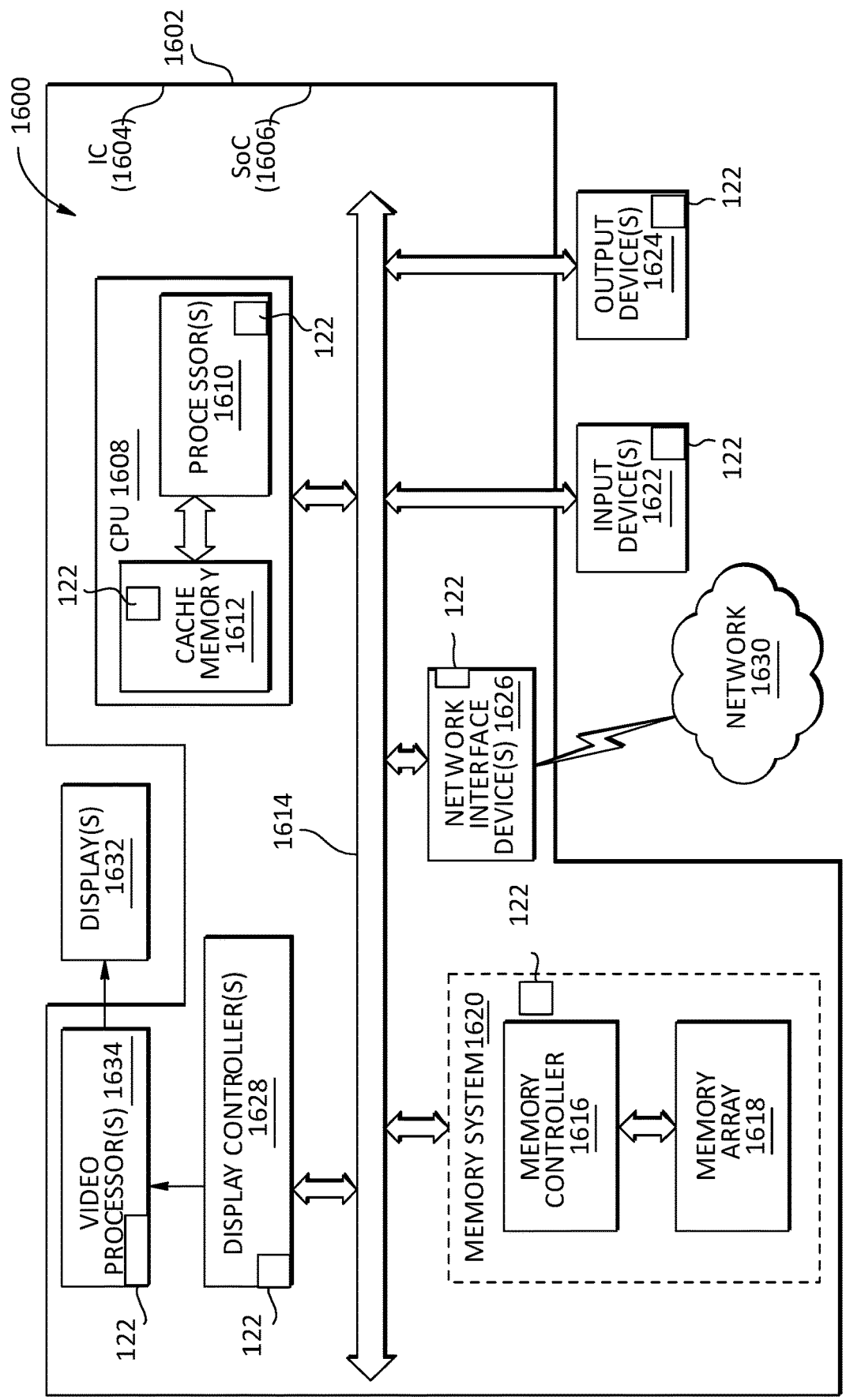
FIG. 16 is a block diagram of an exemplary processor-based system that can include a system address decoding circuit for interleaving addresses across physical regions and across shared memory resources in FIGS. 6 and 7.

In this regard, FIG. 16 illustrates an example of a processor-based system 1600 that can include a system address decoding circuit 122 for interleaving addresses across physical regions and available shared memory resources within a physical region as described in FIGS. 6 and 7, and according to any exemplary aspects disclosed herein. In this example, the processor-based system 1600 may be formed as a SoC 1606 which is an IC 1604. The processor-based system 1600 includes a central processing unit (CPU) 1608 that includes one or more processors 1610, which may also be referred to as CPU cores or processor units. The CPU 1608 may have cache memory 1612 coupled to the CPU 1608 for rapid access to temporarily stored data. The CPU 1608 is coupled to a system bus 1614 and can intercouple master and slave devices included in the processor-based system 1600. As is well known, the CPU 1608 communicates with these other devices by exchanging address, control, and data information over the system bus 1614. For example, the CPU 1608 can communicate bus transaction requests to a memory controller 1616, as an example of a slave device. Although not illustrated in FIG. 16, multiple system buses 1614 could be provided, wherein each system bus 1614 constitutes a different fabric.

Other master and slave devices can be connected to the system bus 1614. As illustrated in FIG. 16, these devices can include a memory system 1620 that includes the memory controller 1616 and a memory array(s) 1618, one or more input devices 1622, one or more output devices 1624, one or more network interface devices 1626, and one or more display controllers 1628, as examples. Each of the memory system 1620, the one or more input devices 1622, the one or more output devices 1624, the one or more network interface devices 1626, and the one or more display controllers 1628 can be provided in the same or different electronic devices 1602. The input device(s) 1622 can include any type of input device, including, but not limited to, input keys, switches, voice processors, etc. The output device(s) 1624 can include any type of output device, including, but not limited to, audio, video, other visual indicators, etc. The network interface device(s) 1626 can be any device configured to allow exchange of data to and from a network 1630. The network 1630 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1626 can be configured to support any type of communications protocol desired.

The CPU 1608 may also be configured to access the display controller(s) 1628 over the system bus 1614 to control information sent to one or more displays 1632. The display controller(s) 1628 sends information to the display(s) 1632 to be displayed via one or more video processor(s) 1634, which process the information to be displayed into a format suitable for the display(s) 1632. The display controller(s) 1628 and video processor(s) 1634 can be included as ICs in the same or different electronic devices 1602, and in the same or different electronic devices 1602 containing the CPU 1608, as an example. The display(s) 1632 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The devices and components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based system for determining a target identification for a memory request comprising:
    a processor configured to determine at least one configuration parameter comprising a plurality of available shared memory resources on a system-on-chip (SoC) in one or more physical regions, each of the plurality of available shared memory resources associated with a target identifier, the at least one configuration parameter further comprising:
        a plurality of hashing regions for system memory addresses which are interleaved across the one or more physical regions and one or more of the plurality of available shared memory resources within a physical region of the one or more physical regions, each hashing region corresponding to a hash circuit and a unique combination of the one or more physical regions and one or more available memory resources; and
    in response to receiving the memory request having a system memory address:
        the processor is configured to determine a first hashing region of the plurality of hashing regions in which the system memory address resides;
        the processor is configured to hash the system memory address based on a first hash circuit corresponding to the first hashing region to identify a first physical region;
        the processor is configured to hash the system memory address based on a second hash circuit corresponding to the first hashing region to select a first available shared memory resource within the first physical region; and
        the processor is configured to determine a first target identifier of the first available shared memory resource.

2. The processor-based system of clause 1, wherein the first available shared memory resource is a first available shared cache memory resource, the processor-based system is further configured to:
    determine whether the memory request misses in the first available shared cache memory resource; and
    in response to the memory request missing in the first available shared cache memory resource, the processor-based system is further configured to:
        hash the system memory address based on a third hash circuit corresponding to the first hashing region to select a first available memory interface out of one or more available memory interfaces within the first physical region; and
        determine a second target identifier of the first available memory interface.

3. The processor-based system of clauses 1-2,
    wherein the plurality of hashing regions define a physical address space in the processor-based system, each of the plurality of hashing regions comprising a subset of the physical address space which are contiguous with adjacent hashing regions; and
    wherein the processor is configured to hash the system memory address based on the second hash circuit corresponding to the first hashing region to select the first available shared memory resource within the first physical region, the processor further configured to:
  apply a modulo multiply operation to ensure that each of the one or more of the plurality of available shared memory resources will be sequentially targeted for each sequential address within the first hashing region.
4. The processor-based system of clause 3,
  wherein the processor is configured to hash the system memory address based on the second hash circuit corresponding to the first hashing region to select the first available shared memory resource within the first physical region, the processor further configured to:
    modify the selected first available shared memory resource by a modulo add operation to ensure that a lowest memory address of the first hashing region resolves to an available shared memory resource which is sequential to a last available shared memory resource mapped from a last address in a lower adjacent hash region.
5. The processor-based system of clause 4, wherein a number of the one or more of the plurality of available shared memory resources within the physical region has a factor of three (3), five (5), or seven (7).
6. The processor-based system of clause 4, wherein a number of the one or more of the plurality of available shared memory resources within the physical region has a factor of two (2), four (4), or eight (8).
7. The processor-based system of clauses 2-6,
  wherein a first number of the plurality of available shared memory resources in the first physical region is not equal to a second number of the one or more available memory interfaces in the first physical region,
  wherein the processor is configured to determine the at least one configuration parameter of the plurality of available shared memory resources on the SoC in the one or more physical regions, the processor further configured to:
    configure a collection of memory index tables wherein each memory index table is unique for each of one or more shared memory resources in the first physical region, the collection of memory index tables interleaving the system memory addresses equally across the one or more available memory interfaces in the first physical region, and
  wherein the processor is configured to determine the second target identifier of the first available memory interface, the processor is further configured to: look up an address into a first memory index table configured to the first available shared memory resource to retrieve the first target identifier.
8. A method of determining a target identification for a memory request in a processor-based system comprising:
  determining at least one configuration parameter comprising a plurality of available shared memory resources on a system-on-chip (SoC) in one or more physical regions, each of the plurality of available shared memory resources associated with a target identifier, the at least one configuration parameter further comprising:
    a plurality of hashing regions for system memory addresses which are interleaved across the one or more physical regions and one or more of the plurality of available shared memory resources within a physical region of the one or more physical regions, each hashing region corresponds to a hash circuit and a unique combination of the one or more physical regions and one or more available memory resources; and
  in response to receiving the memory request having a system memory address:
    determining a first hashing region of the plurality of hashing regions in which the system memory address resides;
    hashing the system memory address based on a first hash circuit corresponding to the first hashing region to identify a first physical region;
    hashing the system memory address based on a second hash circuit corresponding to the first hashing region to select a first available shared memory resource within the first physical region; and
    determining a first target identifier of the first available shared memory resource.
9. The method of clause 8, wherein the first available shared memory resource is a first available shared cache memory resource, the method further comprising:
  determining whether the memory request misses in the first available shared cache memory resource; and
  in response to the memory request missing in the first available shared cache memory resource:
    hashing the system memory address based on a third hash circuit corresponding to the first hashing region to select a first available memory interface out of one or more available memory interfaces within the first physical region; and
    determining a second target identifier of the first available memory interface.
10. The method of clauses 8-9,
  wherein the plurality of hashing regions define a physical address space in the processor-based system, each of the plurality of hashing regions comprising a subset of the physical address space which are contiguous with adjacent hashing regions; and
  wherein hashing the system memory address based on the second hash circuit corresponding to the first hashing region to select the first available shared memory resource within the first physical region further comprises:
    applying a modulo multiply operation to ensure that each of the one or more of the plurality of available shared memory resources will be sequentially targeted for each sequential address within the first hashing region.
11. The method of clause 10,
  wherein hashing the system memory address based on the second hash circuit corresponding to the first hashing region to select the first available shared memory resource within the first physical region further comprises:
    modifying the selected first available shared memory resource by a modulo add operation to ensure that the lowest memory address of the first hashing region resolves to an available shared memory resource which is sequential to a last available shared memory resource mapped from a last address in a lower adjacent hash region.
12. The method of clause 11, wherein a number of the one or more of the plurality of available shared memory resources within the physical region has a factor of three (3), five (5), or seven (7).
13. The method of clause 11, wherein a number of the one or more of the plurality of available shared memory resources within the physical region has a factor of two (2), four (4), or eight (8).
14. The method of clauses 9-13,
wherein a first number of the plurality of available shared memory resources in the first physical region is not equal to a second number of the one or more available memory interfaces in the first physical region,
wherein determining the at least one configuration parameter of the plurality of available shared memory resources on the SoC in the one or more physical regions further comprises:
configuring a collection of memory index tables wherein each memory index table is unique for each of one or more shared memory resources in the first physical region, the collection of memory index tables interleaving the system memory addresses equally across the one or more available memory interfaces in the first physical region, and
wherein determining the second target identifier of the first available memory interface further comprises:
looking up an address into a first memory index table configured to the first available shared memory resource to retrieve the first target identifier.
15. A non-transitory computer-readable storage medium comprising instructions executable by a processor, which, when executed by the processor, cause the processor to determine a target identification for a memory request in a processor-based system comprising:
determining at least one configuration parameter comprising a plurality of available shared memory resources on a system-on-chip (SoC) in one or more physical regions, each of the plurality of available shared memory resources associated with a target identifier, the at least one configuration parameter further comprising:
a plurality of hashing regions for system memory addresses which are interleaved across the one or more physical regions and one or more of the plurality of available shared memory resources within a physical region of the one or more physical regions, each hashing region corresponding to a hash circuit and a unique combination of the one or more physical regions and one or more available memory resources; and
in response to receiving the memory request having a system memory address:
determining a first hashing region of the plurality of hashing regions in which the system memory address resides;
hashing the system memory address based on a first hash circuit corresponding to the first hashing region to identify a first physical region;
hashing the system memory address based on a second hash circuit corresponding to the first hashing region to select a first available shared memory resource within the first physical region; and
determining a first target identifier of the first available shared memory resource.
16. The non-transitory computer-readable storage medium of clause 15, wherein the first available shared memory resource is a first available shared cache memory resource, the non-transitory computer-readable storage medium further comprising:
determining whether the memory request misses in the first available shared cache memory resource; and
in response to the memory request missing in the first available shared cache memory resource:
hashing the system memory address based on a third hash circuit corresponding to the first hashing region to select a first available memory interface out of one or more available memory interfaces within the first physical region; and
determining a second target identifier of the first available memory interface.
17. The non-transitory computer-readable storage medium of clauses 15-16,
wherein the plurality of hashing regions define a physical address space in the processor-based system, each of the plurality of hashing regions comprising a subset of the physical address space which are contiguous with adjacent hashing regions; and
wherein hashing the system memory address based on the second hash circuit corresponding to the first hashing region to select the first available shared memory resource within the first physical region further comprises:
applying a modulo multiply operation to ensure that each of the one or more of the plurality of available shared memory resources will be sequentially targeted for each sequential address within the first hashing region.
18. The non-transitory computer-readable storage medium of clause 17,
wherein hashing the system memory address based on the second hash circuit corresponding to the first hashing region to select the first available shared memory resource within the first physical region further comprises:
modifying the selected first available shared memory resource by a modulo add operation to ensure that a lowest memory address of the first hashing region resolves to an available shared memory resource which is sequential to a last available shared memory resource mapped from a last address in a lower adjacent hash region.
19. The non-transitory computer-readable storage medium of clause 18, wherein a number of the one or more of the plurality of available shared memory resources within the physical region has a factor of three (3), five (5), or seven (7).
20. The non-transitory computer-readable storage medium of clause 18, wherein a number of the one or more of the plurality of available shared memory resources within the physical region has a factor of two (2), four (4), or eight (8).
21. The non-transitory computer-readable storage medium of clauses 16-20,
wherein a first number of the plurality of available shared memory resources in the first physical region is not equal to a second number of the one or more available memory interfaces in the first physical region,
wherein determining the at least one configuration parameter of the plurality of available shared memory resources on the SoC in the one or more physical regions further comprises:

configuring a collection of memory index tables wherein each memory index table is unique for each of one or more shared memory resources in the first physical region, the collection of memory index tables interleaving the system memory addresses equally across the one or more available memory interfaces in the first physical region, and wherein determining the second target identifier of the first available memory interface further comprises:

looking up an address into a first memory index table configured to the first available shared memory resource to retrieve the first target identifier.

What is claimed is:

1. A processor-based system for determining a target identification for a memory request comprising:

a processor configured to determine at least one configuration parameter comprising a plurality of available shared memory resources on a system-on-chip (SoC) in one or more physical regions, each of the plurality of available shared memory resources associated with a target identifier, the at least one configuration parameter further comprising:

a plurality of hashing regions for system memory addresses which are interleaved across the one or more physical regions and one or more of the plurality of available shared memory resources within a physical region of the one or more physical regions, each hashing region corresponding to a hash circuit and a unique combination of the one or more physical regions and one or more available memory resources; and in response to receiving the memory request having a system memory address:

the processor is configured to determine a first hashing region of the plurality of hashing regions in which the system memory address resides;

the processor is configured to hash the system memory address based on a first hash circuit corresponding to the first hashing region to identify a first physical region;

the processor is configured to hash the system memory address based on a second hash circuit corresponding to the first hashing region to select a first available shared memory resource within the first physical region;

the processor is configured to determine a first target identifier of the first available shared memory resource; and the processor is configured to route and perform the memory request to the first available shared memory resource based on the first target identifier.

2. The processor-based system of claim 1, wherein the first available shared memory resource is a first available shared cache memory resource, the processor further configured to:

determine whether the memory request misses in the first available shared cache memory resource; and in response to the memory request missing in the first available shared cache memory resource, the processor is further configured to:

hash the system memory address based on a third hash circuit corresponding to the first hashing region to select a first available memory interface out of one or more available memory interfaces within the first physical region;

determine a second target identifier of the first available memory interface; and route and perform the memory request to the first available memory interface based on the second target identifier.

3. The processor-based system of claim 2, wherein a first number of the plurality of available shared memory resources in the first physical region is not equal to a second number of the one or more available memory interfaces in the first physical region, wherein the processor is configured to determine the at least one configuration parameter of the plurality of available shared memory resources on the SoC in the one or more physical regions, the processor further configured to:

configure a collection of memory index tables wherein each memory index table is unique for each of one or more shared memory resources in the first physical region, the collection of memory index tables interleaving the system memory addresses equally across the one or more available memory interfaces in the first physical region, and wherein the processor is configured to determine the second target identifier of the first available memory interface, the processor further configured to:

look up an address into a first memory index table configured to the first available shared memory resource to retrieve the first target identifier.

4. The processor-based system of claim 1, wherein the plurality of hashing regions define a physical address space in the processor-based system, each of the plurality of hashing regions comprising a subset of the physical address space which are contiguous with adjacent hashing regions; and wherein the processor is configured to hash the system memory address based on the second hash circuit corresponding to the first hashing region to select the first available shared memory resource within the first physical region, the processor further configured to:

apply a modulo multiply operation to ensure that each of the one or more of the plurality of available shared memory resources will be sequentially targeted for each sequential address within the first hashing region.

5. The processor-based system of claim 4, wherein the processor is configured to hash the system memory address based on the second hash circuit corresponding to the first hashing region to select the first available shared memory resource within the first physical region, the processor further configured to:

modify the selected first available shared memory resource by a modulo add operation to ensure that a lowest memory address of the first hashing region resolves to an available shared memory resource which is sequential to a last available shared memory resource mapped from a last address in a lower adjacent hash region.

6. The processor-based system of claim 5, wherein a number of the one or more of the plurality of available shared memory resources within the physical region has a factor of three (3), five (5), or seven (7).

7. The processor-based system of claim 5, wherein a number of the one or more of the plurality of available shared memory resources within the physical region has a factor of two (2), four (4), or eight (8).

8. A method of determining a target identification for a memory request in a processor-based system comprising:

determining at least one configuration parameter comprising a plurality of available shared memory resources on a system-on-chip (SoC) in one or more physical regions, each of the plurality of available shared memory resources associated with a target identifier, the at least one configuration parameter further comprising:
  a plurality of hashing regions for system memory addresses which are interleaved across the one or more physical regions and one or more of the plurality of available shared memory resources within a physical region of the one or more physical regions, each hashing region corresponding to a hash circuit and a unique combination of the one or more physical regions and one or more available memory resources; and
in response to receiving the memory request having a system memory address:
  determining a first hashing region of the plurality of hashing regions in which the system memory address resides;
  hashing the system memory address based on a first hash circuit corresponding to the first hashing region to identify a first physical region;
  hashing the system memory address based on a second hash circuit corresponding to the first hashing region to select a first available shared memory resource within the first physical region;
  determining a first target identifier of the first available shared memory resource; and
  routing and performing the memory request to the first available shared memory resource based on the first target identifier.

9. The method of claim 8, wherein the first available shared memory resource is a first available shared cache memory resource, the method further comprising:
  determining whether the memory request misses in the first available shared cache memory resource; and
  in response to the memory request missing in the first available shared cache memory resource:
    hashing the system memory address based on a third hash circuit corresponding to the first hashing region to select a first available memory interface out of one or more available memory interfaces within the first physical region;
    determining a second target identifier of the first available memory interface; and
    routing and performing the memory request to the first available memory interface based on the second target identifier.

10. The method of claim 9,
wherein a first number of the plurality of available shared memory resources in the first physical region is not equal to a second number of the one or more available memory interfaces in the first physical region,
wherein determining the at least one configuration parameter of the plurality of available shared memory resources on the SoC in the one or more physical regions further comprises:
  configuring a collection of memory index tables wherein each memory index table is unique for each of one or more shared memory resources in the first physical region, the collection of memory index tables interleaving the system memory addresses equally across the one or more available memory interfaces in the first physical region, and
wherein determining the second target identifier of the first available memory interface further comprises:
  looking up an address into a first memory index table configured to the first available shared memory resource to retrieve the first target identifier.

11. The method of claim 8,
wherein the plurality of hashing regions define a physical address space in the processor-based system, each of the plurality of hashing regions comprising a subset of the physical address space which are contiguous with adjacent hashing regions; and
wherein hashing the system memory address based on the second hash circuit corresponding to the first hashing region to select the first available shared memory resource within the first physical region further comprises:
  applying a modulo multiply operation to ensure that each of the one or more of the plurality of available shared memory resources will be sequentially targeted for each sequential address within the first hashing region.

12. The method of claim 11,
wherein hashing the system memory address based on the second hash circuit corresponding to the first hashing region to select the first available shared memory resource within the first physical region further comprises:
  modifying the selected first available shared memory resource by a modulo add operation to ensure that a lowest memory address of the first hashing region resolves to an available shared memory resource which is sequential to a last available shared memory resource mapped from a last address in a lower adjacent hash region.

13. The method of claim 12, wherein a number of the one or more of the plurality of available shared memory resources within the physical region has a factor of three (3), five (5), or seven (7).

14. The method of claim 12, wherein a number of the one or more of the plurality of available shared memory resources within the physical region has a factor of two (2), four (4), or eight (8).

15. A non-transitory computer-readable storage medium comprising instructions executable by a processor, which, when executed by the processor, cause the processor to determine a target identification for a memory request in a processor-based system comprising:
  determining at least one configuration parameter comprising a plurality of available shared memory resources on a system-on-chip (SoC) in one or more physical regions, each of the plurality of available shared memory resources associated with a target identifier, the at least one configuration parameter further comprising:
    a plurality of hashing regions for system memory addresses which are interleaved across the one or more physical regions and one or more of the plurality of available shared memory resources within a physical region of the one or more physical regions, each hashing region corresponding to a hash circuit and a unique combination of the one or more physical regions and one or more available memory resources; and
  in response to receiving the memory request having a system memory address:
    determining a first hashing region of the plurality of hashing regions in which the system memory address resides;

hashing the system memory address based on a first hash circuit corresponding to the first hashing region to identify a first physical region;

hashing the system memory address based on a second hash circuit corresponding to the first hashing region to select a first available shared memory resource within the first physical region;

determining a first target identifier of the first available shared memory resource; and routing and performing the memory request to the first available shared memory resource based on the first target identifier.

16. The non-transitory computer-readable storage medium of claim 15, wherein the first available shared memory resource is a first available shared cache memory resource, the non-transitory computer-readable storage medium further comprising:

determining whether the memory request misses in the first available shared cache memory resource; and in response to the memory request missing in the first available shared cache memory resource:

hashing the system memory address based on a third hash circuit corresponding to the first hashing region to select a first available memory interface out of one or more available memory interfaces within the first physical region;

determining a second target identifier of the first available memory interface; and routing and performing the memory request to the first available memory interface based on the second target identifier.

17. The non-transitory computer-readable storage medium of claim 16, wherein a first number of the plurality of available shared memory resources in the first physical region is not equal to a second number of the one or more available memory interfaces in the first physical region, wherein determining the at least one configuration parameter of the plurality of available shared memory resources on the SoC in the one or more physical regions further comprises:

configuring a collection of memory index tables wherein each memory index table is unique for each of one or more shared memory resources in the first physical region, the collection of memory index tables interleaving the system memory addresses equally across the one or more available memory interfaces in the first physical region, and wherein determining the second target identifier of the first available memory interface further comprises:

looking up an address into a first memory index table configured to the first available shared memory resource to retrieve the first target identifier.

18. The non-transitory computer-readable storage medium of claim 15, wherein the plurality of hashing regions define a physical address space in the processor-based system, each of the plurality of hashing regions comprising a subset of the physical address space which are contiguous with adjacent hashing regions; and wherein hashing the system memory address based on the second hash circuit corresponding to the first hashing region to select the first available shared memory resource within the first physical region further comprises:

applying a modulo multiply operation to ensure that each of the one or more of the plurality of available shared memory resources will be sequentially targeted for each sequential address within the first hashing region.

19. The non-transitory computer-readable storage medium of claim 18, wherein hashing the system memory address based on the second hash circuit corresponding to the first hashing region to select the first available shared memory resource within the first physical region further comprises:

modifying the selected first available shared memory resource by a modulo add operation to ensure that a lowest memory address of the first hashing region resolves to an available shared memory resource which is sequential to a last available shared memory resource mapped from a last address in a lower adjacent hash region.

20. The non-transitory computer-readable storage medium of claim 19, wherein a number of the one or more of the plurality of available shared memory resources within the physical region has a factor of three (3), five (5), or seven (7).

21. The non-transitory computer-readable storage medium of claim 19, wherein a number of the one or more of the plurality of available shared memory resources within the physical region has a factor of two (2), four (4), or eight (8).

* * * * *